US008695877B2

(12) United States Patent
Mesaros

(10) Patent No.: US 8,695,877 B2
(45) Date of Patent: Apr. 15, 2014

(54) DYNAMIC DISCOUNT DEVICE

(75) Inventor: Gregory J. Mesaros, Tampa, FL (US)

(73) Assignee: eWinWin, Inc., Tampa, FL (US)

( * ) Notice: Subject to any disclaimer, the term of this patent is extended or adjusted under 35 U.S.C. 154(b) by 0 days.

(21) Appl. No.: 12/881,923

(22) Filed: Sep. 14, 2010

(65) Prior Publication Data

US 2011/0004515 A1   Jan. 6, 2011

Related U.S. Application Data

(63) Continuation of application No. 12/042,051, filed on Mar. 4, 2008, now Pat. No. 7,815,114, which is a continuation of application No. 10/867,625, filed on Jun. 15, 2004, now Pat. No. 7,364,086.

(60) Provisional application No. 60/478,768, filed on Jun. 16, 2003.

(51) Int. Cl.
*G06K 15/00* (2006.01)
*G06Q 30/00* (2012.01)

(52) U.S. Cl.
USPC .... 235/383; 705/14.1; 705/14.25; 705/14.49; 705/14.53; 705/14.58

(58) Field of Classification Search
USPC ......... 235/375, 378, 380, 381, 383, 492, 379; 705/14, 14.1, 14.13, 26, 27, 14.25, 705/14.31, 14.49, 14.53, 14.58
See application file for complete search history.

(56) References Cited

U.S. PATENT DOCUMENTS

| | | | |
|---|---|---|---|
| 4,789,928 A | 12/1988 | Fujisaki | |
| 4,799,156 A | 1/1989 | Shavit et al. | |
| 4,887,207 A | 12/1989 | Natarajan | |
| 4,947,028 A | 8/1990 | Gorog | |
| 4,992,940 A | 2/1991 | Dworkin | |
| 5,053,956 A | 10/1991 | Donald et al. | |
| 5,053,957 A | 10/1991 | Suzuki | |
| 5,063,506 A | 11/1991 | Brockwell et al. | |
| 5,402,336 A | 3/1995 | Spiegelhoff et al. | |
| 5,414,838 A | 5/1995 | Kolton et al. | |
| 5,444,630 A | 8/1995 | Dlugos | |
| 5,564,115 A | 10/1996 | Clarkson | |

(Continued)

FOREIGN PATENT DOCUMENTS

| EP | 2000/50970 A2 | 8/2000 |
|---|---|---|
| JP | 11-184910 | 7/1999 |

(Continued)

OTHER PUBLICATIONS

Nellore, et al. Factors Influencing Success in Integrated Product Development (IPD) Projects. IEEE Transactions on Engineering Management, vol. 48, issue 2, May 2001, pp. 164-174.

(Continued)

*Primary Examiner* — Thien M Le
*Assistant Examiner* — April Taylor
(74) *Attorney, Agent, or Firm* — Lewis Roca Rothgerber, LLP

(57) ABSTRACT

Systems and/or methods are disclosed for interacting with a multiple criteria buying and/or selling system to conduct business electronically. A dynamic discount card is disclosed according to an aspect of the present invention. The dynamic discount card comprises an information access component for receiving information and a presentation component for displaying information to a user via the dynamic discount card.

24 Claims, 27 Drawing Sheets

(56) References Cited

U.S. PATENT DOCUMENTS

| | | | |
|---|---|---|---|
| 5,592,375 A | 1/1997 | Salmon et al. | |
| 5,615,109 A | 3/1997 | Eder | |
| 5,623,660 A | 4/1997 | Josephson | |
| 5,664,115 A | 9/1997 | Fraser | |
| 5,689,652 A | 11/1997 | Lupien et al. | |
| 5,710,887 A | 1/1998 | Chelliah et al. | |
| 5,717,989 A | 2/1998 | Tozzoli et al. | |
| 5,732,400 A | 3/1998 | Mandler et al. | |
| 5,734,890 A | 3/1998 | Case et al. | |
| 5,794,207 A | 8/1998 | Walker et al. | |
| 5,797,127 A | 8/1998 | Walker et al. | |
| 5,799,285 A | 8/1998 | Klingmang | |
| 5,822,736 A | 10/1998 | Hartman et al. | |
| 5,826,244 A | 10/1998 | Huberman | |
| 5,835,896 A | 11/1998 | Fisher et al. | |
| 5,837,071 A | 11/1998 | Andersson et al. | |
| 5,842,178 A | 11/1998 | Giovannoli | |
| 5,845,265 A | 12/1998 | Woolston | |
| 5,850,442 A | 12/1998 | Muftic | |
| 5,855,008 A | 12/1998 | Goldhaber et al. | |
| 5,870,721 A | 2/1999 | Norris | |
| 5,878,400 A | 3/1999 | Carter, III | |
| 5,884,271 A | 3/1999 | Pitroda | |
| 5,890,138 A | 3/1999 | Godin et al. | |
| 5,897,620 A | 4/1999 | Walker et al. | |
| 5,903,830 A | 5/1999 | Joao et al. | |
| 5,923,741 A | 7/1999 | Wright et al. | |
| 5,933,817 A | 8/1999 | Hucal | |
| 5,940,807 A | 8/1999 | Purcell | |
| 5,945,653 A | 8/1999 | Walker et al. | |
| 5,950,172 A | 9/1999 | Klingman | |
| 5,960,411 A | 9/1999 | Hartman et al. | |
| 5,966,697 A | 10/1999 | Fergerson et al. | |
| 5,970,478 A | 10/1999 | Walker et al. | |
| 5,974,396 A | 10/1999 | Anderson et al. | |
| 5,974,406 A | 10/1999 | Bisdikian et al. | |
| 5,987,434 A | 11/1999 | Libman | |
| 5,995,943 A | 11/1999 | Bull et al. | |
| 5,999,915 A | 12/1999 | Nathan et al. | |
| 6,014,638 A | 1/2000 | Burge et al. | |
| 6,016,484 A | 1/2000 | Williams et al. | |
| 6,026,383 A | 2/2000 | Ausubel | |
| 6,032,136 A | 2/2000 | Brake et al. | |
| 6,035,289 A | 3/2000 | Chou et al. | |
| 6,052,670 A | 4/2000 | Johnson | |
| 6,055,519 A | 4/2000 | Kennedy et al. | |
| 6,055,573 A | 4/2000 | Gardenswartz et al. | |
| 6,064,981 A | 5/2000 | Barni et al. | |
| 6,078,906 A | 6/2000 | Huberman | |
| 6,101,484 A | 8/2000 | Halbert et al. | |
| 6,108,632 A | 8/2000 | Reeder et al. | |
| 6,108,639 A | 8/2000 | Walker et al. | |
| 6,112,185 A | 8/2000 | Walker et al. | |
| 6,112,189 A | 8/2000 | Rickard et al. | |
| 6,131,087 A | 10/2000 | Luke et al. | |
| 6,141,653 A | 10/2000 | Conklin et al. | |
| 6,151,588 A | 11/2000 | Tozzoli et al. | |
| 6,154,738 A | 11/2000 | Call | |
| 6,167,383 A | 12/2000 | Henson | |
| 6,195,646 B1 | 2/2001 | Grosh et al. | |
| 6,219,653 B1 | 4/2001 | O'Neill et al. | |
| 6,233,566 B1 | 5/2001 | Levine et al. | |
| 6,236,972 B1 | 5/2001 | Shkedy | |
| 6,236,977 B1 | 5/2001 | Verba et al. | |
| 6,236,978 B1 | 5/2001 | Tuzhilin | |
| 6,249,772 B1 | 6/2001 | Walker et al. | |
| 6,253,189 B1 | 6/2001 | Feezell et al. | |
| 6,260,019 B1 | 7/2001 | Courts | |
| 6,260,024 B1 | 7/2001 | Shkedy | |
| 6,266,651 B1 | 7/2001 | Woolston | |
| 6,269,343 B1 | 7/2001 | Pallakoff | |
| 6,289,348 B1 | 9/2001 | Richard et al. | |
| 6,323,894 B1 | 11/2001 | Katz | |
| 6,327,574 B1 | 12/2001 | Kramer et al. | |
| 6,332,127 B1 * | 12/2001 | Bandera et al. | 705/14.55 |
| 6,332,135 B1 | 12/2001 | Conklin et al. | |
| 6,336,105 B1 | 1/2002 | Conklin et al. | |
| 6,338,050 B1 | 1/2002 | Conklin et al. | |
| 6,360,205 B1 | 3/2002 | Iyengar et al. | |
| 6,397,208 B1 | 5/2002 | Lee | |
| 6,415,270 B1 | 7/2002 | Rackson et al. | |
| 6,418,415 B1 | 7/2002 | Walker et al. | |
| 6,418,441 B1 | 7/2002 | Call | |
| 6,449,601 B1 | 9/2002 | Friedland et al. | |
| 6,450,407 B1 * | 9/2002 | Freeman et al. | 235/492 |
| 6,456,986 B1 | 9/2002 | Boardman et al. | |
| 6,466,919 B1 | 10/2002 | Walker et al. | |
| 6,496,568 B1 | 12/2002 | Nelson | |
| 6,505,046 B1 * | 1/2003 | Baker | 455/456.3 |
| 6,507,279 B2 | 1/2003 | Loof | |
| 6,510,434 B1 | 1/2003 | Anderson et al. | |
| 6,519,571 B1 | 2/2003 | Guheen et al. | |
| 6,535,856 B1 | 3/2003 | Tal | |
| 6,553,346 B1 | 4/2003 | Walker et al. | |
| 6,553,350 B2 | 4/2003 | Carter | |
| 6,560,501 B1 | 5/2003 | Walser et al. | |
| 6,578,014 B1 | 6/2003 | Murcko, Jr. | |
| 6,584,451 B1 | 6/2003 | Shoham et al. | |
| 6,587,835 B1 * | 7/2003 | Treyz et al. | 705/14.64 |
| 6,598,026 B1 | 7/2003 | Ojha et al. | |
| 6,601,043 B1 | 7/2003 | Purcell | |
| 6,604,089 B1 | 8/2003 | Van Horn et al. | |
| 6,606,603 B1 | 8/2003 | Joseph et al. | |
| 6,606,607 B1 | 8/2003 | Martin et al. | |
| 6,607,136 B1 | 8/2003 | Atsmon et al. | |
| 6,631,356 B1 | 10/2003 | Van Horn et al. | |
| 6,647,257 B2 * | 11/2003 | Owensby | 455/414.1 |
| 6,647,373 B1 | 11/2003 | Carlton-Foss | |
| 6,658,093 B1 | 12/2003 | Langseth et al. | |
| 6,662,194 B1 | 12/2003 | Joao et al. | |
| 6,705,520 B1 | 3/2004 | Pitroda et al. | |
| 6,716,101 B1 * | 4/2004 | Meadows et al. | 455/456.1 |
| 6,754,636 B1 | 6/2004 | Walker et al. | |
| 6,769,607 B1 | 8/2004 | Pitroda et al. | |
| 6,778,968 B1 | 8/2004 | Gulati | |
| 6,782,370 B1 | 8/2004 | Stack | |
| 6,785,661 B1 | 8/2004 | Dixon et al. | |
| 6,839,690 B1 | 1/2005 | Foth et al. | |
| 6,847,938 B1 | 1/2005 | Moore | |
| 6,847,965 B2 | 1/2005 | Walker et al. | |
| 6,850,907 B2 | 2/2005 | Lutnick et al. | |
| 6,868,392 B1 | 3/2005 | Ogasawara | |
| 6,871,140 B1 | 3/2005 | Florance et al. | |
| 6,871,190 B1 | 3/2005 | Seymour et al. | |
| 6,876,974 B1 | 4/2005 | Marsh et al. | |
| 6,876,977 B1 | 4/2005 | Marks | |
| 6,876,982 B1 | 4/2005 | Lancaster | |
| 6,876,983 B1 | 4/2005 | Goddard | |
| 6,877,655 B1 | 4/2005 | Robertson et al. | |
| 6,877,665 B2 | 4/2005 | Challa et al. | |
| 6,915,275 B2 | 7/2005 | Banerjee et al. | |
| 6,922,674 B1 | 7/2005 | Nelson | |
| 6,925,446 B2 | 8/2005 | Watanabe | |
| 6,928,416 B1 | 8/2005 | Bertash | |
| 6,934,690 B1 | 8/2005 | Van Horn et al. | |
| 6,952,219 B2 | 10/2005 | Lee | |
| 6,954,734 B1 | 10/2005 | Kuelbs et al. | |
| 6,985,879 B2 | 1/2006 | Walker et al. | |
| 6,990,467 B1 | 1/2006 | Kwan | |
| 6,992,794 B2 | 1/2006 | Keane et al. | |
| 7,013,285 B1 | 3/2006 | Rebane | |
| 7,013,286 B1 | 3/2006 | Aggarwal et al. | |
| 7,016,865 B1 | 3/2006 | Weber et al. | |
| 7,035,820 B2 | 4/2006 | Goodwin et al. | |
| 7,039,603 B2 | 5/2006 | Walker et al. | |
| 7,047,206 B1 | 5/2006 | Schultze | |
| 7,062,452 B1 | 6/2006 | Lotvin et al. | |
| 7,065,494 B1 | 6/2006 | Evans | |
| 7,069,228 B1 | 6/2006 | Rose et al. | |
| 7,072,849 B1 | 7/2006 | Filepp et al. | |
| 7,072,853 B2 | 7/2006 | Shkedi | |
| 7,076,447 B1 | 7/2006 | Peyser et al. | |
| 7,080,030 B2 | 7/2006 | Eglen et al. | |
| 7,082,408 B1 | 7/2006 | Baumann et al. | |

(56) References Cited

U.S. PATENT DOCUMENTS

| | | |
|---|---|---|
| 7,103,565 B1 | 9/2006 | Vaid |
| 7,103,567 B2 | 9/2006 | Smukowski |
| 7,107,225 B1 | 9/2006 | McClung, III |
| 7,107,226 B1 | 9/2006 | Cassidy et al. |
| 7,120,592 B1 | 10/2006 | Lewis |
| 7,124,099 B2 | 10/2006 | Mesaros |
| 7,124,107 B1 | 10/2006 | Pishevar et al. |
| 7,133,835 B1 | 11/2006 | Fusz et al. |
| 7,143,057 B2 | 11/2006 | Kuelbs et al. |
| 7,146,330 B1 | 12/2006 | Alon et al. |
| 7,165,045 B1 | 1/2007 | Kim-E |
| 7,181,419 B1 | 2/2007 | Mesaros |
| 7,194,427 B1 | 3/2007 | Van Horn et al. |
| 7,194,442 B1 | 3/2007 | Flanagan et al. |
| 7,213,754 B2 | 5/2007 | Eglen et al. |
| 7,236,575 B2 | 6/2007 | Kim et al. |
| 7,240,021 B1 | 7/2007 | Walker et al. |
| 7,243,082 B1 | 7/2007 | Forlai |
| 7,254,833 B1 | 8/2007 | Cornelius et al. |
| 7,263,498 B1 | 8/2007 | Van Horn et al. |
| 7,263,505 B1 | 8/2007 | Forlai |
| 7,296,001 B1 | 11/2007 | Ephrati et al. |
| 7,330,826 B1 | 2/2008 | Porat et al. |
| 7,343,317 B2 | 3/2008 | Jokinen et al. |
| 7,349,890 B1 | 3/2008 | Pathak et al. |
| 7,363,246 B1 | 4/2008 | Van Horn et al. |
| 7,364,086 B2 | 4/2008 | Mesaros |
| 7,376,613 B1 | 5/2008 | Cofino et al. |
| 7,379,899 B1 | 5/2008 | Junger |
| 7,415,428 B2 | 8/2008 | Garwood |
| 7,415,617 B2 | 8/2008 | Ginter et al. |
| 7,433,832 B1 | 10/2008 | Bezos et al. |
| 7,467,103 B1 | 12/2008 | Murray et al. |
| 7,475,024 B1 | 1/2009 | Phan |
| 7,480,627 B1 | 1/2009 | Van Horn et al. |
| 7,496,543 B1 | 2/2009 | Bamford et al. |
| 7,516,089 B1 | 4/2009 | Walker et al. |
| 7,523,045 B1 | 4/2009 | Walker et al. |
| 7,539,742 B2 | 5/2009 | Spector |
| 7,542,927 B2 | 6/2009 | Mukai |
| 7,552,069 B2 | 6/2009 | Kepecs |
| 7,577,582 B1 | 8/2009 | Ojha et al. |
| 7,584,146 B1 | 9/2009 | Duhon |
| 7,593,871 B1 | 9/2009 | Mesaros |
| 7,596,509 B1 | 9/2009 | Bryson |
| 7,599,857 B2 | 10/2009 | Bishop et al. |
| 7,606,731 B2 | 10/2009 | McClung, III |
| 7,624,044 B2 | 11/2009 | Wren |
| 7,630,919 B1 | 12/2009 | Obrecht |
| 7,636,672 B2 | 12/2009 | Angles et al. |
| 7,672,870 B2 | 3/2010 | Haines et al. |
| 7,680,696 B1 | 3/2010 | Murray |
| 7,689,463 B1 | 3/2010 | Mesaros |
| 7,689,468 B2 | 3/2010 | Walker et al. |
| 7,689,469 B1 | 3/2010 | Mesaros |
| 7,693,748 B1 | 4/2010 | Mesaros |
| 7,698,173 B1 | 4/2010 | Burge et al. |
| 7,698,208 B2 | 4/2010 | Hirani et al. |
| 7,698,240 B1 | 4/2010 | Chatterjee et al. |
| 7,706,838 B2 | 4/2010 | Atsmon et al. |
| 7,725,350 B2 | 5/2010 | Schlee |
| 7,729,977 B2 | 6/2010 | Xiao et al. |
| 7,747,473 B1 | 6/2010 | Mesaros |
| 7,792,699 B2 | 9/2010 | Kwie |
| 7,801,803 B2 | 9/2010 | Forlai |
| 7,813,955 B2 * | 10/2010 | Ariff et al. ............... 705/14.28 |
| 7,814,106 B2 | 10/2010 | Guido et al. |
| 7,814,114 B2 | 10/2010 | Mi et al. |
| 7,818,212 B1 | 10/2010 | Mesaros |
| 7,860,776 B1 | 12/2010 | Chin et al. |
| 7,890,373 B2 | 2/2011 | Junger |
| 7,899,707 B1 | 3/2011 | Mesaros |
| 7,912,761 B2 | 3/2011 | Vaid |
| 7,917,386 B2 | 3/2011 | Christensen |
| 7,917,416 B2 | 3/2011 | Quinn et al. |
| 7,937,288 B2 | 5/2011 | Blaser et al. |
| 7,942,316 B2 | 5/2011 | Bennett et al. |
| 7,953,730 B1 | 5/2011 | Bleckner et al. |
| 7,958,007 B2 | 6/2011 | Urbanski et al. |
| 8,005,747 B2 | 8/2011 | Forlai |
| 8,015,583 B2 | 9/2011 | Bates et al. |
| 8,024,226 B2 | 9/2011 | Fusz et al. |
| 8,032,409 B1 | 10/2011 | Mikurak |
| 8,032,422 B2 | 10/2011 | Pickard et al. |
| 8,036,941 B2 | 10/2011 | Bennett et al. |
| 8,073,762 B2 | 12/2011 | Sheth et al. |
| 8,104,682 B2 | 1/2012 | Junger |
| 8,140,402 B1 | 3/2012 | Mesaros |
| 8,140,405 B2 | 3/2012 | Mesaros |
| 8,140,442 B2 | 3/2012 | Heyer |
| 8,140,615 B2 | 3/2012 | Miller et al. |
| 8,150,735 B2 | 4/2012 | Walker et al. |
| 8,160,931 B2 | 4/2012 | Mesaros |
| 8,171,561 B2 | 5/2012 | Moskowitz et al. |
| 8,196,811 B2 | 6/2012 | Mesaros |
| 8,209,226 B2 | 6/2012 | Cheney et al. |
| 8,219,460 B1 | 7/2012 | Mesaros |
| 8,249,942 B2 | 8/2012 | Mesaros |
| 8,271,327 B2 | 9/2012 | Walker et al. |
| 8,271,332 B2 | 9/2012 | Mesaros |
| 8,285,598 B2 | 10/2012 | Mesaros |
| 8,285,600 B2 | 10/2012 | Mesaros |
| 8,290,824 B1 | 10/2012 | Mesaros |
| 8,306,870 B2 | 11/2012 | Mesaros |
| 8,311,896 B2 | 11/2012 | Mesaros |
| 8,341,033 B2 | 12/2012 | Porat et al. |
| 8,341,035 B2 | 12/2012 | Mesaros |
| 8,401,918 B2 | 3/2013 | Mesaros |
| 8,438,075 B2 | 5/2013 | Mesaros |
| 8,473,353 B2 | 6/2013 | Matsuda et al. |
| 8,489,466 B1 | 7/2013 | Van Horn et al. |
| 8,494,914 B2 | 7/2013 | Mesaros |
| 8,494,915 B2 | 7/2013 | Mesaros |
| 8,533,002 B2 | 9/2013 | Mesaros |
| 8,567,672 B2 | 10/2013 | Mesaros |
| 8,573,492 B2 | 11/2013 | Mesaros |
| 8,584,940 B2 | 11/2013 | Mesaros |
| 8,589,247 B2 | 11/2013 | Mesaros |
| 8,590,785 B1 | 11/2013 | Mesaros |
| 8,616,449 B2 | 12/2013 | Mesaros |
| 8,620,765 B2 | 12/2013 | Mesaros |
| 8,626,605 B2 | 1/2014 | Mesaros |
| 8,635,108 B2 | 1/2014 | Mesaros |
| 2001/0011247 A1 | 8/2001 | O'Flaherty et al. |
| 2001/0011264 A1 | 8/2001 | Kawasaki |
| 2001/0014868 A1 | 8/2001 | Herz et al. |
| 2001/0018660 A1 | 8/2001 | Sehr |
| 2001/0039514 A1 | 11/2001 | Barenbaum |
| 2001/0044751 A1 | 11/2001 | Pugliese, III et al. |
| 2001/0047296 A1 | 11/2001 | Wyker |
| 2001/0047311 A1 | 11/2001 | Singh |
| 2002/0004765 A1 | 1/2002 | Han et al. |
| 2002/0007324 A1 | 1/2002 | Centner et al. |
| 2002/0026351 A1 | 2/2002 | Coleman |
| 2002/0032573 A1 | 3/2002 | Williams et al. |
| 2002/0035536 A1 | 3/2002 | Gellman |
| 2002/0040352 A1 | 4/2002 | McCormick |
| 2002/0046105 A1 | 4/2002 | Gardenswartz et al. |
| 2002/0046147 A1 | 4/2002 | Livesay et al. |
| 2002/0052782 A1 | 5/2002 | Landesmann |
| 2002/0065762 A1 | 5/2002 | Lee et al. |
| 2002/0065769 A1 | 5/2002 | Irribarren et al. |
| 2002/0069079 A1 | 6/2002 | Vega |
| 2002/0080950 A1 | 6/2002 | Koko et al. |
| 2002/0082881 A1 | 6/2002 | Price et al. |
| 2002/0091580 A1 | 7/2002 | Wang |
| 2002/0099643 A1 | 7/2002 | Abeshouse et al. |
| 2002/0103741 A1 | 8/2002 | Boies et al. |
| 2002/0107773 A1 | 8/2002 | Abdou |
| 2002/0116282 A1 | 8/2002 | Martin et al. |
| 2002/0143692 A1 | 10/2002 | Heimermann et al. |
| 2002/0147670 A1 | 10/2002 | Lange |
| 2002/0165771 A1 | 11/2002 | Walker et al. |
| 2002/0165821 A1 | 11/2002 | Tree |

(56) References Cited

U.S. PATENT DOCUMENTS

| | | |
|---|---|---|
| 2002/0169703 A1 | 11/2002 | Lutnick et al. |
| 2002/0169759 A1 | 11/2002 | Kraft et al. |
| 2002/0174000 A1 | 11/2002 | Katz et al. |
| 2002/0174051 A1 | 11/2002 | Wise |
| 2002/0178077 A1 | 11/2002 | Katz et al. |
| 2002/0188508 A1 | 12/2002 | Lee et al. |
| 2003/0004802 A1 | 1/2003 | Callegari |
| 2003/0004808 A1 | 1/2003 | Elhaoussine et al. |
| 2003/0004823 A1 | 1/2003 | Sagy |
| 2003/0028473 A1 | 2/2003 | Eso et al. |
| 2003/0041002 A1 | 2/2003 | Hao et al. |
| 2003/0055774 A1 | 3/2003 | Ginsberg |
| 2003/0088494 A1 | 5/2003 | Lee |
| 2003/0093355 A1 | 5/2003 | Issa |
| 2003/0109949 A1 | 6/2003 | Ikeda et al. |
| 2003/0111531 A1 | 6/2003 | Williams et al. |
| 2003/0115100 A1 * | 6/2003 | Teicher .................. 705/14 |
| 2003/0126040 A1 | 7/2003 | Mesaros |
| 2003/0126250 A1 | 7/2003 | Jhanji |
| 2003/0149619 A1 | 8/2003 | Stanley et al. |
| 2003/0167222 A1 | 9/2003 | Mehrotra et al. |
| 2003/0195832 A1 | 10/2003 | Cao et al. |
| 2003/0200150 A1 | 10/2003 | Westcott et al. |
| 2003/0208412 A1 | 11/2003 | Hillestad et al. |
| 2003/0216960 A1 * | 11/2003 | Postrel .................. 705/14 |
| 2003/0233276 A1 | 12/2003 | Pearlman et al. |
| 2003/0233557 A1 | 12/2003 | Zimmerman |
| 2004/0015415 A1 | 1/2004 | Cofino et al. |
| 2004/0019494 A1 | 1/2004 | Ridgeway et al. |
| 2004/0019646 A1 | 1/2004 | Zweben et al. |
| 2004/0039661 A1 * | 2/2004 | Fuzell-Casey et al. ......... 705/27 |
| 2004/0039677 A1 | 2/2004 | Mura et al. |
| 2004/0093276 A1 | 5/2004 | Nishio |
| 2004/0128197 A1 | 7/2004 | Bam et al. |
| 2004/0153431 A1 | 8/2004 | Bhogal et al. |
| 2004/0172372 A1 | 9/2004 | Wells et al. |
| 2004/0215467 A1 | 10/2004 | Coffman et al. |
| 2004/0215500 A1 | 10/2004 | Monahan |
| 2005/0021400 A1 | 1/2005 | Postrel |
| 2005/0021401 A1 | 1/2005 | Postrel |
| 2005/0038713 A1 | 2/2005 | Pickard et al. |
| 2005/0149458 A1 | 7/2005 | Eglen et al. |
| 2005/0171918 A1 | 8/2005 | Eden et al. |
| 2005/0197857 A1 | 9/2005 | Avery |
| 2005/0216337 A1 | 9/2005 | Roberts et al. |
| 2005/0272442 A1 * | 12/2005 | Miller et al. ............... 455/456.1 |
| 2005/0273415 A1 | 12/2005 | Mathews et al. |
| 2005/0288954 A1 | 12/2005 | McCarthy et al. |
| 2006/0036491 A1 | 2/2006 | Leung et al. |
| 2006/0059062 A1 | 3/2006 | Wood et al. |
| 2006/0069619 A1 | 3/2006 | Walker et al. |
| 2006/0095327 A1 | 5/2006 | Vaughn et al. |
| 2006/0095366 A1 | 5/2006 | Sheth et al. |
| 2006/0106678 A1 | 5/2006 | Walker et al. |
| 2006/0129454 A1 | 6/2006 | Moon et al. |
| 2006/0143080 A1 | 6/2006 | Garg et al. |
| 2006/0155598 A1 | 7/2006 | Spur et al. |
| 2006/0178918 A1 | 8/2006 | Mikurak |
| 2006/0190379 A1 | 8/2006 | Maas et al. |
| 2006/0259421 A1 | 11/2006 | Maass |
| 2007/0150349 A1 | 6/2007 | Handel et al. |
| 2007/0206584 A1 | 9/2007 | Fulling et al. |
| 2007/0212938 A1 | 9/2007 | Shin |
| 2007/0220169 A1 | 9/2007 | Silver et al. |
| 2008/0015711 A1 | 1/2008 | Charland et al. |
| 2008/0052189 A1 | 2/2008 | Walker et al. |
| 2008/0052750 A1 | 2/2008 | Grunnet-Jepsen et al. |
| 2008/0071634 A1 | 3/2008 | Rampell et al. |
| 2008/0082418 A1 | 4/2008 | Fordyce et al. |
| 2008/0126201 A1 | 5/2008 | Ullah |
| 2008/0146204 A1 | 6/2008 | Gu et al. |
| 2008/0147534 A1 * | 6/2008 | Ephrati et al. .................. 705/37 |
| 2008/0249846 A1 | 10/2008 | Yonemoto et al. |
| 2008/0255886 A1 | 10/2008 | Unkefer et al. |
| 2009/0055328 A1 | 2/2009 | Bamford et al. |
| 2009/0059856 A1 | 3/2009 | Kermoal et al. |
| 2009/0083136 A1 | 3/2009 | Blackwood |
| 2009/0089177 A1 | 4/2009 | Dayton et al. |
| 2009/0150218 A1 | 6/2009 | Brunner et al. |
| 2009/0187455 A1 | 7/2009 | Fernandes et al. |
| 2009/0198622 A1 | 8/2009 | Temte et al. |
| 2009/0276305 A1 | 11/2009 | Clopp |
| 2009/0307073 A1 | 12/2009 | MirrokniBanadaki et al. |
| 2009/0319359 A1 | 12/2009 | Soza et al. |
| 2009/0327034 A1 | 12/2009 | Peterson |
| 2009/0327038 A1 | 12/2009 | Peterson |
| 2009/0327101 A1 | 12/2009 | Sayed |
| 2009/0327140 A1 | 12/2009 | Kuo |
| 2010/0088174 A1 | 4/2010 | Cohagan et al. |
| 2010/0125525 A1 | 5/2010 | Inamdar |
| 2010/0169161 A1 | 7/2010 | Sacco |
| 2011/0016010 A1 | 1/2011 | Mesaros |
| 2011/0040624 A1 * | 2/2011 | Jhanji .................. 705/14.57 |
| 2011/0125592 A1 | 5/2011 | Mesaros |
| 2011/0213648 A1 | 9/2011 | Mesaros |
| 2011/0213649 A1 | 9/2011 | Mesaros |
| 2011/0213650 A1 | 9/2011 | Mesaros |
| 2011/0213653 A1 | 9/2011 | Mesaros |
| 2011/0238476 A1 | 9/2011 | Carr et al. |
| 2011/0246271 A1 | 10/2011 | Mesaros |
| 2011/0246274 A1 | 10/2011 | Mesaros |
| 2011/0264499 A1 | 10/2011 | Abendroth et al. |
| 2011/0270699 A1 | 11/2011 | Mesaros |
| 2011/0270700 A1 | 11/2011 | Mesaros |
| 2012/0022970 A1 | 1/2012 | Mesaros |
| 2012/0029993 A1 | 2/2012 | Mesaros |
| 2012/0029995 A1 | 2/2012 | Mesaros |
| 2012/0035999 A1 | 2/2012 | Mesaros |
| 2012/0036000 A1 | 2/2012 | Mesaros |
| 2012/0036031 A1 | 2/2012 | Mesaros |
| 2012/0041811 A1 | 2/2012 | Mesaros |
| 2012/0054012 A1 | 3/2012 | Mesaros |
| 2012/0158475 A1 | 6/2012 | Mesaros |
| 2012/0158479 A1 | 6/2012 | Raisch |
| 2012/0179526 A1 | 7/2012 | Mesaros |
| 2012/0179530 A1 | 7/2012 | Mesaros |
| 2012/0197705 A1 | 8/2012 | Mesaros |
| 2012/0197722 A1 | 8/2012 | Mesaros |
| 2012/0203603 A1 | 8/2012 | Mesaros |
| 2012/0203611 A1 | 8/2012 | Mesaros |
| 2012/0203615 A1 | 8/2012 | Mesaros |
| 2012/0209683 A1 | 8/2012 | Mesaros |
| 2012/0209737 A1 | 8/2012 | Mesaros |
| 2012/0209738 A1 | 8/2012 | Mesaros |
| 2012/0209739 A1 | 8/2012 | Mesaros |
| 2012/0209740 A1 | 8/2012 | Mesaros |
| 2012/0209743 A1 | 8/2012 | Mesaros |
| 2012/0226541 A1 | 9/2012 | Mesaros |
| 2012/0245993 A1 | 9/2012 | Mesaros |
| 2012/0253912 A1 | 10/2012 | Mesaros |
| 2012/0253977 A1 | 10/2012 | Mesaros |
| 2012/0265590 A1 | 10/2012 | Mesaros |
| 2012/0265600 A1 | 10/2012 | Mesaros |
| 2012/0278157 A1 | 11/2012 | Mesaros |
| 2012/0284110 A1 | 11/2012 | Mesaros |
| 2012/0290395 A1 | 11/2012 | Mesaros |
| 2012/0310738 A1 | 12/2012 | Mesaros |
| 2013/0006741 A1 | 1/2013 | Mesaros |
| 2013/0013385 A1 | 1/2013 | Mesaros |
| 2013/0013388 A1 | 1/2013 | Mesaros |
| 2013/0080282 A1 | 3/2013 | Mesaros |
| 2013/0117086 A1 | 5/2013 | Mesaros |
| 2013/0246122 A1 | 9/2013 | Mesaros |
| 2013/0246223 A1 | 9/2013 | Mesaros |
| 2013/0275253 A1 | 10/2013 | Mesaros |

FOREIGN PATENT DOCUMENTS

| | | |
|---|---|---|
| WO | 9821713 A2 | 4/1998 |
| WO | 00/70424 A2 | 11/2000 |
| WO | WO 2008/083371 | 7/2008 |

OTHER PUBLICATIONS

OA dated Feb. 23, 2010 for U.S. Appl. No. 09/426,063, 11 pages.
OA dated Mar. 19, 2008 for U.S. Appl. No. 11/152,462, 26 pages.

(56) References Cited

OTHER PUBLICATIONS

OA dated Apr. 29, 2009 for U.S. Appl. No. 10/464,585, 19 pages.
OA dated Jul. 2, 2009 for U.S. Appl. No. 09/426,063, 24 pages.
OA dated Sep. 9, 2009 for U.S. Appl. No. 11/556,604, 60 pages.
OA dated Oct. 6, 2009 for U.S. Appl. No. 12/042,051, 53 pages.
OA dated Oct. 28, 2009 for U.S. Appl. No. 10/464,585, 37 pages.
OA dated Nov. 27, 2009 for U.S. Appl. No. 11/680,431, 43 pages.
OA dated Apr. 16, 2010 for U.S. Appl. No. 12/042,051, 32 pages.
OA dated Apr. 29, 2010 for U.S. Appl. No. 10/464,585, 16 pages.
OA Dated Apr. 10, 2009 for U.S. Appl. No. 10/351,069, 27 pages.
OA Dated Apr. 6, 2009 for U.S. Appl. No. 11/680,431, 33 pages.
OA Dated Feb. 6, 2009 for U.S. Appl. No. 09/626,296, 11 pages.
OA Dated Mar. 25, 2009 for U.S. Appl. No. 11/556,604, 59 pages.
OA Dated Nov. 3, 2008 for U.S. Appl. No. 11/150,920, 161 pages.
OA Dated Oct. 20, 2008 for U.S. Appl. No. 10/464,585, 11 pages.
OA Dated Oct. 27, 2008 for U.S. Appl. No. 11/464,376, 13 pages.
OA Dated Oct. 29, 2008 for U.S. Appl. No. 11/152,462, 27 pages.
O'Gorman, et al. Considerations for Connecting Renewable Generation into Bulk Supply Networks. Sixth International Conference on Advances in Power System Control, Operation and Management, ASDCOM 2003, vol. 2, Nov. 11-14, pp. 674-680. Last accessed Sep. 10, 2009, 7 pages.
Rahim, et al. Optimal Decision Rules for Determining the Length of Production Run, (Abstract Only), Computers and Industrial Engineering, vol. 9, No. 2, pp. 195-202, 1985.
Rahim, et al. "Optimal Production Run for a Process Having Multi-level Tool Wear," (Abstract only), International Journal of Systems Science, vol. 19, No. 1, pp. 139-149, 1988.
Rahim, et al. "Optimal Production Run for a Process with Random Linear Drift," (Abstract only), Omega, vol. 16, No. 4, pp. 347-351, 1988.
Scott. Chains of Trust, Supply Chain Management, Manufacturing Engineer, vol. 75, issue 4, Aug. 1996, pp. 172-174.
Scott. Supply Partnerships in the Aerospace Industry. Transforming Your Material Flow: A Practical Insight Into World Class Logistics and Supply Chain Management IEE Colloquium on, Oct. 24, 1996, pp. 3/1-3/3.
Scott. Supply Partnerships and the Effective Management of Low Cost Components. Transforming Your Material Flow: A Practical Insight Into World Class Logistics and Supply Chain Management IEE Colloquium on, Mar. 19, 1996, pp. 2/1-2/4.
Sivakumar, et al. Price Match Guarantees: Rationale, Implementation, and Consumer Response. Pricing Strategy and Practice, Bradford, 1996, vol. 4, issue 4, 11 pgs. Recovered from ProQuest Database Aug. 25, 2006.
Sjostrom. Price Discrimination by Shipping Conferences. Logistics and Transportation Review, Jun. 1992, [from Dialog® File 15, acc. No. 00727777 93-76998].
Stacklin. "Bridgestone Printing Unit Teams with ewinwin", Mar. 25, 2002, Crain's Cleveland Business, vol. 23, issue 12, 3 pages.
Tanaka. "As Other Companies Crumble, Ecount Carves Out Niche in Online-Payment Services." Knight Rider Tribune News Service, Washington, Feb. 27, 2002. (Recovered from ProQuest Database Dec. 4, 2006.).
Thomas, et al. JIT: Strategies for Distant Suppliers (Abstract). Business, vol. 40, No. 4, pp. 36-39, Dec. 1990.
Watson. The Effects of Demand Forecast Fluctuations on Customer Service and Inventory Cost When Demand is Lumpy. Journal of the Operational Research Society, vol. 38, No. 1, pp. 75-82, Jan. 1987. http://www.palgrave-journals.com/jors/journal/v38/n1/abs/jors19879a.html. Last accessed Sep. 10, 2009, 8 pages.
Wayback Machine. "Searched for http://www.ewinwin.com/corp/ewinwinwhitepaper.pdf", Oct. 2, 2008, Archive.org.
Yeh, et al. "Optimal Production Run Length for Products Sold with Warranty," (Abstract only), European Journal of Operational Research, vol. 120, No. 3, pp. 575-582, Feb. 1, 2000.
"Supplier pricing and lot sizing when demand is price sensitive". Abad, P.L. Fac. of Bus., McMaster Univ., Hamilton, Ont., Canada. European Journal of Operational Research, vol. 78, No. 3, p. 334-54. Date: Nov. 10, 1994 [recovered from Dialog on Oct. 20, 2009]. 1 page.
Efficient bid pricing based on costing methods for Internet bid systems Sung Eun Park; Yong Kyu Lee. Dept. of Comput. Eng., Dongguk Univ., South Korea. Book Title: Web Information Systems—WISE 2006. 7th International Conference on Web Information Systems Engineering. Proceedings (Lecture Notes in Computer Science vol. 42) [recovered from Dialog on ]. 1 page.
OA mailed Feb. 18, 2011 for U.S. Appl. No. 11/680,431, 33 pages.
OA mailed Mar. 21, 2011 for U.S. Appl. No. 12/887,778, 38 pages.
OA mailed Jan. 24, 2011 for U.S. Appl. No. 11/680,415, 24 pages.
OA mailed Feb. 23, 2011 for U.S. Appl. No. 11/618,412, 27 pages.
OA mailed Mar. 28, 2011 for U.S. Appl. No. 11/618,418, 22 pages.
OA dated Apr. 6, 2011 for U.S. Appl. No. 12/788,513, 38 pages.
OA dated Aug. 2, 2011 for U.S. Appl. No. 11/680,415, 27 pages.
OA dated Jul. 28, 2011 for U.S. Appl. No. 12/704,280, 55 pages.
OA dated Sep. 2, 2011 for U.S. Appl. No. 11/680,431, 24 pages.
OA dated Sep. 12, 2011 for U.S. Appl. No. 09/922,884, 31 pages.
OA dated Sep. 21, 2011 for U.S. Appl. No. 13/106,622, 52 pages.
Amazon.com, "Earths Biggest Selection," Jun. 30, 2001, archived by Archive.org: http://web.archive.org/web/20010630130618/http://www.amazon.com/exec/obidos/subst/home/home.html.
Anon., "ELCOM: Virgin Trains Cuts Procurement Costs with elcom.com; New Electronic Ordering System Offers Personalised Pricing," M2 Presswire, Jul. 18, 2000.
Anon., "Open Market Introduces New Software for Dynamic Web-Based Commerce" PR Newswire, Oct. 1, 1996.
Boroshok, Jon, "Wireless, Location-Based, Shopping Portal being Tested in New York City and San Francisco by GeePS.com, Inc.," published Apr. 3, 2000, New York, NY and San Francisco, CA; as downloaded from http://www.techmarcom.com/geeps.html on Jan. 6, 2012.
Business/High Tech Editors "Mercata Launches Compelling Alternative to Online Auctions," Business Wire, Nov. 15, 2000.
ebay.com "eBay Services: The Feedback Forum," Aug. 1, 2001, archived by archive.org: "http://web.archive.org/web/20010801145144/http://pages.ebay.com/services/forum/feedback.html".
Garner, K., "Culture Vulture: Up from Under—Germaine Greer," Off our Backs, Jun. 24, 1971, vol. 1, Iss. 23, p. 14.
Ha, Sung Ho et al., "Matching Buyers and Suppliers: An Intelligent Dynamic-Exchange Model," IEEE Intelligent Systems, 2001.
Hinze, Annika et al., "Location- and Time-Based Information Delivery in Tourism," as downloaded Apr. 20, 2012 from http://page.mi.fu-berlin.de/voisard/Papers/sstd03.pdf.
IEEE Xplore Search Results, Aug. 12, 2007.
Kauffman et al., "Bid Together Buy Together, On the Efficacy of Group-Buying Business models in Internet-based Selling," May 16, 200.
Mercata.com "How to Ship an Order" Oct. 22, 2000, archived by archive.org: http://web.archive.org/web/20001022035135/http://www.mercata.com/cgi-bin/mercata/mercata/v1/pages/editorial.jsp?name=Ship+an+Order.
Mercata.com, archived by archive.org on or before Jun. 19, 2000.
Millman, H., "Legacy Data Links Shrinks Costs," InfoWorld, vol. 20, No. 1, pp. 51, 56, Jan. 5, 1998.
Rajaraman, Rajesh et al., "The Effect of Demand Elasticity on Security Prices for the Poolco and Multi-Lateral Contract Models," IEEE Transactions on Power Systems, vol. 12, No. 3, Aug. 1997.
Rozic, Jeff "Who's Watching While You Surf?" Inside Business 3, 5, 64, May 2001.
Tippr http://www.tipper.com/ Internet Archive (Feb. 29, 2008)—http://web.archive.org/web/20080229121727/http://tippr.com/.
WHN Selects MobShop to Power Aggregated Buying for WHN Exchange. Jan. 23, 2001. http://www.allbusiness.com/retail-trade/4291613-1.html. Last accessed Sep. 11, 2009, 2 pages.
U.S. Appl. No. 09/922,884 Final Office Action mailed Jan. 4, 2012.
U.S. Appl. No. 13/104,723 Office Action mailed Mar. 22, 2012.
U.S. Appl. No. 13/106,622 Final Office Action mailed Jan. 3, 2012.
U.S. Appl. No. 13/270,133 Office Action mailed Jan. 3, 2012.
U.S. Appl. No. 12/710,095 Office Action mailed Apr. 6, 2012.
U.S. Appl. No. 13/161,192 Office Action mailed Apr. 5, 2012.

(56) References Cited

OTHER PUBLICATIONS

U.S. Appl. No. 13/251,668 Office Action mailed Feb. 9, 2012.
U.S. Appl. No. 13/251,668 Final Office Action mailed Apr. 17, 2012.
U.S. Appl. No. 13/160,128 Final Office Action mailed Feb. 22, 2012.
U.S. Appl. No. 13/105,387 Office Action mailed Jan. 3, 2012.
U.S. Appl. No. 13/272,147 Office Action mailed Jan. 10, 2012.
Adam et al. "Strategic Directions in Electronic Commerce and Digital Libraries: Towards a Digital Agora". *ACM Computing Surveys* [Online] 1996, vol. 28, Issue 4, pp. 818-835.
U.S. Appl. No. 13/269,360 Final Office Action mailed Jul. 6, 2012.
U.S. Appl. No. 12/710,095 Final Office Action mailed Jul. 28, 2012.
U.S. Appl. No. 13/345,681 Office Action mailed Jun. 20, 2012.
U.S. Appl. No. 11/618,412 Final Office Action mailed May 1, 2012.
U.S. Appl. No. 13/271,464 Office Action mailed May 10, 2012.
U.S. Appl. No. 09/922,884 Office Action mailed May 1, 2012.
U.S. Appl. No. 13/104,723 Final Office Action mailed Jun. 8, 2012.
U.S. Appl. No. 13/270,133 Final Office Action mailed Jun. 12, 2012.
U.S. Appl. No. 13/292,971 Office Action mailed Jun. 14, 2012.
U.S. Appl. No. 13/272,144 Office Action mailed May 16, 2012.
U.S. Appl. No. 11/680,415 Final Office Action mailed May 2, 2012.
*eWinWin, Inc. v. Groupon, Inc.* Appeal Per Curiam Decision dated Oct. 9, 2012.
*eWinWin, Inc. v. Groupon, Inc.* Reply Brief of Appellant dated Jun. 4, 2012.
*eWinWin, Inc. v. Groupon, Inc.* Brief of Appellee dated May 17, 2012.
*eWinWin, Inc. v. Groupon, Inc.* Brief of Appellant dated Apr. 2, 2012.
Order re Motion for Summary Judgment dated Nov. 23, 2011.
eWinWin, Inc.'s Opposition to Groupon, Inc.'s Motion for Summary Judgment of Non-Infringement dated Nov. 8, 2011.
Groupon, Inc.'s Motion for Summary Judgment of Non-lnfringment dated Oct. 17, 2011.
Order re eWinWin, Inc. Motion for Reconsideration dated Oct. 3, 2011.
Order re Claim Construction dated Sep. 5, 2011.
eWinWin, Inc. Supplemental Brief in Support of Claim Construction dated Aug. 24, 2011.
Groupon, Inc.'s Supplemental Claim Construction Brief dated Aug. 24, 2011.
eWinWin, Inc.'s Reply Brief in Support of Claim Construction dated Aug. 5, 2011.
Groupon, Inc.'s Responsive Claim Construction Brief dated Aug. 5, 2011.
Groupon, Inc.'s Opening Claim Constructin Brief dated Jul. 5, 2011.
Opening Claim Construction Brief of eWinWin, Inc.dated Jul. 5, 2011.
U.S. Appl. No. 13/275,054 Final Office Action mailed Nov. 5, 2012.
U.S. Appl. No. 13/292,971 Office Action mailed Dec. 4, 2012.
U.S. Appl. No. 13/292,971 Office Action mailed Sep. 14, 2012.
U.S. Appl. No. 13/449,275 Office Action mailed Oct. 4, 2012.
U.S. Appl. No. 13/449,276 Office Action mailed Sep. 26, 2012.
U.S. Appl. No. 13/449,658 Office Action mailed Oct. 30, 2012.
U.S. Appl. No. 13/452,647 Office Action mailed Dec. 7, 2012.
U.S. Appl. No. 13/460,512 Office Action mailed Dec. 10, 2012.
U.S. Appl. No. 13/523,820 Office Action mailed Nov. 8, 2012.
U.S. Appl. No. 13/525,040 Office Action mailed Nov. 23, 2012.
U.S. Appl. No. 13/407,622 Office Action mailed Dec. 3, 2012.
U.S. Appl. No. 13/407,622 Office Action mailed Sep. 12, 2012.
U.S. Appl. No. 13/251,668 Office Action mailed Sep. 14, 2012.
U.S. Appl. No. 13/345,681 Final Office Action mailed Sep. 20, 2012.
U.S. Appl. No. 13/621,158 Office Action mailed Dec. 5, 2012.
U.S. Appl. No. 13/274,213 Final Office Action mailed Aug. 1, 2012.
U.S. Appl. No. 13/538,302 Office Action mailed Oct. 25, 2012.
U.S. Appl. No. 13/105,387 Final Office Action mailed Aug. 15, 2012.
U.S. Appl. No. 11/618,418 Final Office Action mailed Jul. 26, 2012.
U.S. Appl. No. 11/680,415 Office Action mailed Aug. 31, 2012.
U.S. Appl. No. 13/517,528 Office Action mailed Dec. 6, 2012.
Mercata.com, "Our Privacy Policy", Archived by Archive.org on or before May 26, 2000.
Mercata.com, "Special Offers", Archived by Archive.org on or before Jun. 19, 2000.
Mercata.com, "Terms of Use", Published by Mercata.com, Nov. 6, 2000.
We-Commerce.com, "The We-Commerce™ Network Mission", Archived by Archive.org on or before Oct. 23, 2000.
U.S. Appl. No. 13/104,723 Office Action mailed Feb. 22, 2013.
U.S. Appl. No. 13/269,360 Final Office Action mailed Apr. 17, 2013.
U.S. Appl. No. 13/270,133 Final Office Action mailed Feb. 1, 2013.
U.S. Appl. No. 13/275,054 Final Office Action mailed Feb. 21, 2013.
U.S. Appl. No. 13/292,971 Final Office Action mailed Apr. 18, 2003.
U.S. Appl. No. 13/449,275 Final Office Action mailed Feb. 22, 2013.
U.S. Appl. No. 13/449,276 Final Office Action mailed Feb. 25, 2013.
U.S. Appl. No. 13/452,647 Final Office Action mailed May 2, 2013.
U.S. Appl. No. 13/460,478 Final Office Action mailed Apr. 29, 2013.
U.S. Appl. No. 13/460,478 Office Action mailed Dec. 20, 2012.
U.S. Appl. No. 13/460,512 Final Office Action mailed May 2, 2013.
U.S. Appl. No. 13/523,820 Office Action mailed Feb. 26, 2013.
U.S. Appl. No. 13/491,449 Final Office Action mailed May 2, 2013.
U.S. Appl. No. 13/491,449 Office Action mailed Dec. 19, 2012.
U.S. Appl. No. 13/525,040 Final Office Action mailed Apr. 18, 2013.
U.S. Appl. No. 13/407,622 Final Office Action mailed Apr. 17, 2013.
U.S. Appl. No. 13/609,806 Final Office Action mailed May 1, 2013.
U.S. Appl. No. 13/609,806 Office Action mailed Jan. 10, 2013.
U.S. Appl. No. 13/251,668 Office Action mailed May 10, 2013.
U.S. Appl. No. 13/251,668 Final Office Action mailed Dec. 24, 2012.
U.S. Appl. No. 13/609,250 Office Action mailed Jan. 3, 2013.
U.S. Appl. No. 13/621,158 Final Office Action mailed Mar. 27, 2013.
U.S. Appl. No. 13/274,213 Office Action mailed Apr. 23, 2013.
U.S. Appl. No. 13/274,213 Final Office Action mailed Jan. 9, 2013.
U.S. Appl. No. 11/152,462 Office Action mailed Feb. 6, 2013.
U.S. Appl. No. 13/160,128 Office Action mailed May 23, 2013.
U.S. Appl. No. 13/160,176 Office Action mailed Apr. 19, 2013.
U.S. Appl. No. 13/538,302 Final Office Action mailed Mar. 26, 2013.
U.S. Appl. No. 13/272,147 Final Office Action mailed Jan. 9, 2013.
U.S. Appl. No. 11/680,431 Office Action mailed Mar. 11, 2013.
U.S. Appl. No. 13/517,528 Office Action mailed May 8, 2013.
U.S. Appl. No. 13/584,809 Office Action mailed Feb. 14, 2013.
"Excite@Home Standardizes on Siebel eBusiness; Leading Broadband Media Company Relies on Siebel Systems to Manage Customer Relationships Across Its Entire Family of Services," Business Wire, Jan. 19, 2000, 2 pages.
Mack, Going Local. Adweek, Jul. 10, 2000, pp. 38-39, © 2006 ProQuest Info&Learning. Last accessed Sep. 17, 2010, 2 pages.
De Gheest, Computer Implemented Electronic Bidding for Electronic Sales Application. Derwent Acc No. 2001-006585, © 2010 Derwent Information Ltd. Last accessed Sep. 17, 2010, 2 pages.
Swartz. Wireless Ads: Loved/Loathed. Wireless Review, Oct. 1, 2000. © 2006 The Gale Group. Last accessed Sep. 17, 2010, 3 pages.
OA dated Sep. 17, 2010 for U.S. Appl. No. 11/618,412, 97 pages.
OA dated Sep. 3, 2010 for U.S. Appl. No. 11/618,418, 125 pages.
OA dated Aug. 4, 2010 for U.S. Appl. No. 11/680,415, 65 pages.
OA dated Oct. 21, 2010 for U.S. Appl. No. 12/788,513, 62 pages.
"Global Real Estate Markets Spell Opportunity, Experts Tell Realtors," PR Newswire, Nov. 21, 1991.
"Lucent Launches On-Line Catalog" M2 Presswire, Jan. 22, 1999.
"Screen Savers," Lawyer, Feb. 19, 2001.
"The Oil and Gas Asset Clearinghouse, a Pertoleum Place Company, to Host It's Second Exclusively Online Auction of Oil and Gas Properties on Aug. 14-16, 2000." PR Newswire, p. 5591, Aug. 3, 2000, 2 pages.
Accompany: How it Works: "Anatomy of a Buy-Cycle", Jun. 15, 1999, pp. 1-3.
Amazon.com, "Help/Shipping", Archived on Feb 2, 2003 by www.archive.org. Last accessed Mar. 19, 2008, 9 pages.
Ashton Technology Group, Inc. Announces NASDAQ National Market System Listing; Enters into Clearing Arrangements with 8 National Brokerage Firms, Business Wire, Jan. 3, 2000. http://www.findarticles.com/p/articles/mi_m0EIN/is_2000_Jan_3/ai_58429780/print. Last accessed Apr. 8, 2009, 3 pages.
Beaty. Mass Customisation. Manufacturing Engineer, vol. 75, issue 5, Oct. 1996, pp. 217-220.
Blyth, et al. Merchandising System Collecting Data. Derwent Information Ltd. Last accessed Jan. 20, 2009, 2 pages.

(56) References Cited

OTHER PUBLICATIONS

Breyer. "Bargains in Cyberspace," National Home Center News, vol. 26, No. 21, p. 21, Nov. 20, 2000.
Business Editors and High Tech Writers, "eWinWin Announces the Release of DAS 3.0, the Next Generation of B2B Demand Aggregation Solutions" Dec. 28, 2000, Businee wire, p. 1 (4 pages).
Business Editors. "Weatherchem Announces Major eCommerce Success with eWinWin", Aug. 9, 2001, Business Wire, (p. 1) 2 pages.
CBOT, "Trading in Futures Can Provide Considerable Financial Rewards", Last accessed Mar. 19, 2008, 41 pages.
Chicago Board of Trade, "Knowledge Center," as archived by Archive.org, on Feb. 13, 2003.
China—Welcome to the Machine: New Machinery, Electronics B-to-B Website Launched. China Online, Jul. 24, 2000, 1 page.
Computer Geeks Discount Outlet, "Order Status," Mar. 1, 2002.
Deierlein. "Smart Fuel Buying," Fleet Equipment, vol. 24, No. 8, pp. 42-44, Aug. 1998.
Dibiase. The Inventory Simulator: A Micro Computer Based Inventory Model. Modeling and Simulation on Microcomputers, Paul F. Hogan, ed., Society for Computer Simulation (SCS), La Jolla, pp. 104-106, Jan. 1987.
DomainTradeLIVE! Launched by solutionhome.com. Business Wire, Oct. 20, 1999, 1 page.
Easley, et al. Time and the Process of Security Price Adjustment, Journal of Finance, vol. 47, No. 2, Jun. 1992. http://ideas.repec.org/a/bla/jfinan/v47y1992i2p576-605.html. Last accessed Sep. 10, 2009, 30 pages.
Edwards. "Increase Your Bottom Line : Automated Customer Service and Marketing," E-Business Advisor, vol. 17, No. 7, p. 30, Jul. 1999.
ENOS. Vying to be the Top Dog. Upside vol. 12, No. 3, pp. 160-165, Mar. 2000.
eWinWin, "eCommerce Redefined : The Positive Impact of eWinWin's Demand Aggregation System on the Manufacturing Supply Chain", Oct. 2000. Last accessed Mar. 19, 2008, 11 pages.
Gaonkar, et al. Strategic Sourcing and Collaborative Planning in Internet Enabled Supply Chain Networks Producing Multigeneration Products. IEEE Transactions on Automation Science and Engineering, vol. 2, issue 1, Jan. 2005, pp. 54-66.
Gurley. Creating a Great E-Commerce Business. Fortune, Mar. 16, 1998.
International Search Report for PCT Application No. PCT/US 07/89195, mailed May 12, 2008, 8 pages.
Jonsson, et al. Impact of Processing and Queueing Times on Order Quantities. Mater. Flow, vol. 2, No. 4, pp. 221-230, Aug. 1985.
Kantrow, American Express Sets a Three-Tier Pricing on Optima, Dialog: File 148 #05812190 (The Gale Group), American Banker, v157, n25, p. 1(2), Feb. 6, 1992.
Koenig, et al. Quantitative Industrial Ecology. IEEE Transactions on Systems, Man and Cybernetics, Part C, Issue 1, Feb. 1998, pp. 16-28.
Lamparter. "Natural Selection." American Printer, vol. 217, No. 3, pp. 54-64, Jun. 1996.
Magna Cash Cybersource Partner to Expand Online Payment Options. PR Newswire, New York, Jan. 15, 2001.
Market Engineering Research for Structural Impacts of e-Business in the European Chemicals Industry (Ch. 3), Structural Impact of e-Business on the Chemicals Industry, Frost & Sullivan, Market Research Report, Jun. 2001.
Maxwell, Pricing education in the United States of America: responding to the needs of business, The Journal of Product & Brand Management, Santa Barbara, Aug. 1998, vol. 7, Issue 4, p. 336-341.
Medrano, et al. Strategic Behaviour and Price Discovery, RAND Journal of Economics, vol. 32, No. 2, Jun. 21, 2001. https://editorialexpress.com/cgi-bin/rje_online.cgi?action=view&year=2001&issue=sum&page=221&&tid=83197&sc=uogfbloa. Last accessed Sep. 3, 2009, 29 pages.
Meriam Webster's Collegiate Dictionary, Tenth Edition, 1997, p. 732.
Meridex Introduces Advanced Features to its B2B Network, PR Newswire, May 25, 2000. Available online: http://www.canadait.com/cfm/index.cfm?It=106&Id=3421&Se=355&Sv=Company&Lo=441. Last accessed Apr. 30, 2009, 3 pages.
Mesaros. Innovation in Difficult Times : How US Manufacturers are Using Demand Aggregation to Increase Sales and Lower Costs. Jul. 26, 2001. Last accessed Mar. 19, 2008, 4 pages.
MobShop Launches New Rev of Selling App, Online Reporter, May 28, 2001. http://findarticles.com/p/articles/mi_hb5932/is_200105/ai_n23884526/. Last accessed Apr. 30, 2009, 2 pages.
MobShop Selected by WHN(TM) (WhatsHotNow.com (R), Inc.) to Power Demand Aggregation Within Its Licensed Merchandise Marketplace; Demand Aggregation Technology Enables Marketplaces to Improve Liquidity by Generating Volume Transactions, PR Newswire, San Francisco, Jan. 16, 2001.
Moody. From E-Commerce to We-Commerce. Computer Weekly, 42, Jun. 3, 1999. Last accessed Apr. 9, 2009, 2 pages.
Mullich. Altrade Serves as a Natural Resource—A Head Start and Big Trading Volume Give the Natural Gas Marketplace a Competitive Edge. Can it Last? Information Week, 152, Jun. 12, 2000, 3 pages.
Myers. "E-Solutions for Surplus Inventory," Dsn Retailing Today, vol. 39, No. 21, p. 13, Nov. 6, 2000.
U.S. Appl. No. 13/681,403 Office Action mailed Aug. 21, 2013.
U.S. Appl. No. 13/270,133 Office Action mailed Jun. 21, 2013.
U.S. Appl. No. 13/523,820 Final Office Action mailed Jun. 28, 2013.
U.S. Appl. No. 13/891,154 Office Action mailed Aug. 28, 2013.
U.S. Appl. No. 13/792,721 Office Action Sep. 10, 2013.
U.S. Appl. No. 13/621,158 Office Action mailed Oct. 11, 2013.
U.S. Appl. No. 13/105,441 Office Action mailed May 31, 2013.
U.S. Appl. No. 11/152,462 Final Office Action mailed Aug. 22, 2013.
U.S. Appl. No. 12/704,151 Office Action mailed Jul. 30, 2013.
U.S. Appl. No. 13/105,387 Office Action mailed Jun. 4, 2013.
U.S. Appl. No. 11/680,415 Office Action mailed Sep. 16, 2013.
U.S. Appl. No. 11/680,431 Final Office Action mailed Jun. 27, 2013.
U.S. Appl. No. 13/584,809 Office Action mailed Jul. 24, 2013.
U.S. Appl. No. 13/104,723 Office Action mailed Nov. 25, 2013.
U.S. Appl. No. 13/269,360 Final Office Action mailed Dec. 6, 2013.
U.S. Appl. No. 14/077,969 Office Action mailed Jan. 3, 2014.
U.S. Appl. No. 12/710,095, Gregory J. Mesaros, Multiple Criteria Buying and Selling Model, filed Feb. 22, 2010.
U.S. Appl. No. 14/077,969, Gregory J. Mesaros, Presenting Offers to Users of Wireless Devices, filed Nov. 12, 2013.
U.S. Appl. No. 14/154,632, Gregory J. Mesaros Presenting Offers to Users of Mobile Devices, filed Jan. 14, 2014.
U.S. Appl. No. 11/152,462, Gregory J. Mesaros, Flexible Ship Schedules and Dynamic Discounts, filed Jun. 14, 2005.
U.S. Appl. No. 11/618,412, Gregory J. Mesaros, Hosted Demand Aggregation, filed Dec. 29, 2006.
U.S. Appl. No. 13/198,964, Gregory J. Mesaros, Volume Pricing Search, filed Aug. 5, 2011.
U.S. Appl. No. 14/065,037, Gregory J. Mesaros, Discounts in a Mobile Device, filed Oct. 28, 2013.
U.S. Appl. No. 14/075,316, Gregory J. Mesaros Promoting Offers Through Social Network Influencers, filed Nov. 8, 2013.

* cited by examiner

← 908

BUYER REGISTRATION

BUYER NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):

Fig. 12

| BUYER DATA NAME, ADDRESS, CONTACT, ETC. | USER NAME | PASSWORD | CREDIT CARD NO. & EXP. |
|---|---|---|---|
| BUYER 1 | USER NAME (1) | PASSWORD (1) | XXXXXXXX EXP. 05/03 |
| ... | ... | ... | ... |
| BUYER (N) | USER NAME (N) | PASSWORD (N) | CREDIT CARD (N) |

ADDING DEAL CRITERIA

- 1031 → SELLER #3
- 1032 → PRODUCT TYPE: GLASS
- 1033 → CURRENT DEAL #: 3

1062 → ENTER CRITERIA NAME: GLASS PURITY

1064 — SELLER/SELLER ADDITIONAL
- SELLER
- SELLER ADDITIONAL

1066 — CRITERIA TYPE
- RANGE
- TYPE
- MINIMUM
- MAXIMUM

1068 — CRITERIA UNITS
- PERCENT
- UNITS
- POUNDS (LB.)
- KILOGRAMS
- NONE
- DAYS
- MONTHS
- YEARS
- DOLLARS

1070 — SUBMIT NEW CRITERIA FOR CURRENT DEAL

1072 — SUBMIT NEW CRITERIA FOR ALL PRODUCT DEALS

1076 — REVIEW BUYER INPUTTED CRITERIA

1078 — REVIEW OTHER SELLER CRITERIA

1080 — CANCEL

SELLER REGISTRATION

SELLER NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):

Fig. 16

| SELLER DATA NAME, ADDRESS, CONTACT, ETC. | USER NAME | PASSWORD | CREDIT CARD NO. & EXP. |
|---|---|---|---|
| SELLER 1 | USER NAME (1) | PASSWORD (1) | XXXXXXXX EXP. 07/03 |
| . . . | . . . | . . . | . . . |
| SELLER (N) | USER NAME (N) | PASSWORD (N) | CREDIT CARD (N) |

DYNAMIC DISCOUNT DEVICE

CROSS-REFERENCE TO RELATED APPLICATIONS

This application is a continuation of and claims priority under 35 U.S.C. § 119(e) to U.S. patent application Ser. No. 12/042,051 filed Mar. 4, 2008 entitled "DYNAMIC DISCOUNT CARD TIED TO PRICE CURVES & GROUP DISCOUNTS" which claims priority to U.S. patent application Ser. No. 10/867,625 filed Jun. 15, 2004 entitled "DYNAMIC DISCOUNT CARD TIED TO PRICE CURVES & GROUP DISCOUNTS" which claims priority to U.S. Provisional Patent application Ser. No. 60/478,768 entitled "DYNAMIC DISCOUNT CARD TIED TO PRICE CURVES AND GROUP DISCOUNTS" and filed Jun. 16, 2003, the entireties of these applications are incorporated by reference herein.

TECHNICAL FIELD

The present invention relates to an e-commerce multiple criteria buying and selling methodology and more particularly to a method and apparatus of using the e-commerce multiple criteria buying and selling methodology to conduct business electronically.

BACKGROUND OF THE INVENTION

The buying and selling of products and services has resulted in a vast array of buying schemes that are used to vary the price at which such products are sold.

One of the most common buying schemes which business encounters everyday is known as volume buying. According to this buying scheme, sellers set a fixed unit price for their products based on the volume of units that a buyer is willing to purchase. Buyers desiring to purchase products from the seller are each required to pay the same fixed price depending on the volume of units the buyer is purchasing. If a seller finds that the demand for a given product is greater or less than expected, the seller may later adjust the fixed price per unit of the product to account for such findings. Although the fixed price per unit system provides a simple way for a seller to conduct business with multiple buyers, one drawback of this buying scheme is that it fails to provide buyers with a choice between a variety of different buying criteria that may be just as important or more important to the buyer than price.

For example, a buyer that is in need of goods, such as raw materials to make products for an expedited order may be willing to pay a higher price for a faster delivery time. Another buyer may be concerned with the quality of the goods they are purchasing, such that the buyer would pay a higher price for goods having a minimum number of defects. Yet another buyer may be concerned with the warranty time allotted for the goods they are purchasing, and may want the warranty of the goods that they are purchasing to match or exceed the warranty the buyers are offering their own customers.

Yet another buying scheme that has been advanced in recent years is buyer-driven bidding. According to this buying scheme, a single buyer desiring to obtain a product communicates a price at which the buyer is willing to purchase the product to multiple sellers. Each of the sellers is provided an opportunity to review the buyer's price. A sale is complete when one of the sellers agrees to sell the product to the buyer at the price suggested by the buyer. A buyer-driven bidding scheme is described in U.S. Pat. No. 5,794,207 assigned to Walker Asset Management Limited Partnership of Stamford, Conn. Another buyer-driven bidding scheme is described in U.S. Pat. No. 5,897,620 assigned to priceline.com Inc of Stamford, Conn. While the buyer-driven bidding scheme provides advantages for certain types of transactions when, for example, sellers may be willing to sell products at lower than normal prices, the uncertainties involved with whether a buyer's offer will be accepted is often problematic for high volume commercial transactions in which the reliability that a transaction will be complete is of paramount importance. Another problem with the present buying schemes is that the buyers have no control in determining the criteria of the product or services that they may receive, while the seller has no control of the type of purchase that the buyers request.

While the buying schemes described above have various advantages and disadvantages in different situations, a commonality among all of the buying schemes is that each buyer is not given the opportunity to choose amongst different buying criteria, which could be more important to the buyer than the price of the goods and/or services. Furthermore, each seller is not given a chance to offer their goods and/or services based on different selling criteria. In many instances, sellers are not even aware of what buyers consider important buying criteria. Additionally, sellers are sometimes not aware of what other selling criteria that other sellers might offer buyers.

Moreover, for manufactured items and many services, the seller's capacity is finite. Accordingly, only so many widgets can be produced on a single production line within a single facility during a given amount of time, and only so many services can be delivered by a set number of resources. Thus, these capacities can vary in moments as capacity is utilized or lost.

Accordingly, there is a strong need in the art for a multiple criteria buying and selling scheme, which provides both buyers and sellers more control in a commercial purchasing transaction, and overcomes the above mentioned drawbacks and others.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

According to an aspect of the present invention, a dynamic discount card is provided. The dynamic discount card can interact with a multiple criteria buying and/or selling system or methodology to conduct business electronically. The dynamic discount card comprises an information access component and a presentation component. The information access component obtains pricing and product information. The information is displayed utilizing the presentation component.

According to aspect of the present invention, a user input component is provided. The user input component facilitates a user's ability to search for information to be displayed via the presentation component. Additionally and/or alternatively, the user input component facilitates a user's ability to place an order and/or make a counteroffer.

According to another aspect of the present invention, a multiple criteria buying and selling methodology is provided. The multiple criteria buying and selling methodology is structured to provide buyers and sellers with a variety of information relating to criteria in the purchasing of products to complete a business transaction. By providing the buyers and sellers with a variety of information, the buyers are able to make an informed decision in the buying process relating to each buyer's particular needs, and the sellers are able to control the type of purchases for their goods and services. To facilitate buying and selling products using the multiple criteria buying and selling methodology, an electronic forum is provided whereby buyers and sellers are able to conveniently exchange information and order products.

In the multiple criteria buying and selling methodology, a seller initially establishes a deal structure for a product, which provides selling criteria information relating to the purchasing of the product, such as volume per unit price, quality, delivery time and warranty information that a buyer will be able to review if the selling criteria matches a buyer inputted buying criteria. The deal structure is preferably set up so as to provide buyers with both price and non-price criteria information that the buyers would consider important in a purchase of the type of product being offered by the seller. The deal structure is electronically made available to potential buyers of the product. For example, the deal structure may be displayed on an Internet site.

Accordingly, the multiple criteria buying and selling methodology provides more control for both buyers and sellers in the purchasing process. Buyers define the buying criteria which they feel is important in purchasing a particular good or service. Sellers define the selling criteria which the seller feels is important to both the buyer and the seller. The buyer is provided with a list of deals in which the buyers' buying criteria falls within the sellers' selling criteria. Furthermore, the multiple criteria buying methodology encourages the completion of deals. The multiple criteria buying and selling methodology allows a buyer to complete a deal in an expedited manner. The buyer can control their criteria and the seller can control their criteria allowing a more efficient manner of conducting business.

Thus, according to one aspect of the present invention, a business transaction methodology is provided. The methodology includes offering a plurality of deals for at least one of a product and service offered by at least one seller inputting a plurality of buying criteria by a buyer for the at least one of a product and service, and outputting a list of deals from amongst the plurality of deals that match the buying criteria of the buyer.

In accordance with another aspect of the present invention an Internet business transaction system is provided. The Internet business transaction system, includes a computer adapted to be employed by a facilitator for hosting a commercial transaction over the Internet, the computer providing access to at least one buyer and at least one seller to carry out the commercial transaction, wherein at least one buyer makes a purchase from the at least one seller when a plurality of buying criteria defined by the buyer matches a plurality of selling criteria defined by the seller.

In accordance with yet another aspect of the present invention, a method of conducting a business transaction is provided. The method includes electronically offering a plurality of deals on at least one of a product and service for sale, each of said plurality of deals being based on different offering criteria than each other of said plurality of deals, electronically searching the deals on the product for sale based on a plurality of ordering criteria, outputting a list of deals of the plurality of deals which offering criteria matches the ordering criteria and selecting one of the deals of the list of deals which offering criteria matches the ordering criteria.

In accordance with another aspect of the present invention, an electronic signal is provided that is adapted to be transmitted between at least two computers. The electronic signal includes an algorithm for matching a buyer with at least one deal offered by at least one seller, the algorithm matches the buyer with the at least one deal based on a plurality of buying criteria defined by the buyer which matches a plurality of selling criteria defined by the at least one seller.

In accordance with yet another aspect of the present invention an Internet business transaction system is provided. The internet business transaction system includes means for hosting a commercial transaction over the Internet, the means for hosting provides access to at least one buyer and at least one seller to carry out the commercial transaction, wherein the at least one buyer makes a purchase from the at least one seller when a plurality of ordering criteria, fall within the outer limits of a plurality of offering criteria, each ordering criteria being based on a buyer defined buying criteria, and each offering criteria being defined by the seller.

In accordance with yet another aspect of the present invention an Internet business transaction system is provided. The Internet business transaction system includes a first computer adapted to be employed by a facilitator for hosting a commercial transaction over the Internet, a second computer adapted to be used by a buyer to link to the first computer to participate in the commercial transaction, a third computer adapted to be used by a seller to link to the first computer to participate in the commercial transaction, wherein the buyer makes a purchase from the seller when a plurality of buyer defined buying criteria matches a plurality of seller defined selling criteria.

In accordance with yet another aspect of the present invention a server is provided. The server includes a processor, a memory coupled to the processor, and a network interface coupled to the processor for transmitting and receiving data with at least one remote computer system, wherein a plurality of deals for a product offered for sale electronically is stored in the memory, each of the plurality of deals having different seller defined selling criteria, and wherein the server is configured to receive orders for the product from a plurality of different buyers via the at least one remote computer system, by providing the plurality of different buyers with at least one deal of the plurality of deals matching a plurality of buyer defined buying criteria.

In accordance with still yet another aspect of the present invention, a system for conducting business electronically is provided. The system includes a central server, at least one computer system coupled to the server via a network, wherein a plurality of deals for a product offered for sale electronically is stored in the central server, each of the plurality of deals having different seller defined selling criteria, and wherein the server is configured to receive orders for the product from a plurality of different buyers via the at least one remote computer system, by providing the plurality of buyers with at least one deal of the plurality of deals matching a plurality of buyers defined buying criteria.

Another aspect of the present invention relates to a business transaction methodology, including the steps of: offering a plurality of deals for at least one of a product and service offered by at least one buyer; inputting a plurality of selling criteria by a seller for the at least one of a product and service; and outputting a list of deals from amongst the plurality of deals that match the selling criteria of the seller Yet another aspect of the invention relates to a system for providing an electronic-based forum for conducting business transactions. The system includes means for creating a virtual deal room accessible by at least one seller and a plurality of buyers, the virtual deal room being dedicated to carrying out a business transaction for a specific product or service; means for aggregating purchase orders from at least two of the buyers of the plurality of buyers; means for presenting the aggregated purchase orders to the at least one seller; and means for closing a transaction between the at least one seller and the at least two buyers regarding the aggregated purchase orders.

Another aspect of the present invention relates to an electronic-based forum for conducting business transactions, comprising: a first system for creating a virtual deal room accessible by at least two sellers and at least two buyers, the virtual deal room being dedicated to carrying out a business transaction for a specific product or service; a second system for aggregating at least one of purchase orders or offers for sale of the specific product or service from at least one group of the sellers and buyers; a third system for presenting the at least one of the aggregated purchase orders or aggregated offers for sale to at least one seller or buyer, respectively; and a fourth system for closing a transaction for the specific product or service.

Still another aspect of the present invention relates to an electronic-based forum for conducting business transactions, comprising: a first system for creating a virtual deal room accessible by one buyer and a plurality of sellers of a specific product or service; a second system for aggregating offers for sale of the specific product or service from at least two of the sellers; a third system for presenting the aggregated offers for sale to the buyer; and a fourth system for closing a transaction for the specific product or service.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 12 illustrates an on-line registration form for a buyer in accordance with one aspect of the present invention.

FIG. 13 illustrates a buyer database stored in a central server in accordance with one aspect of the present invention.

FIG. 14d illustrates an input screen for adding buying and selling criteria to the deal in accordance with one aspect of the present invention.

FIG. 16 illustrates an on-line registration form for a seller in accordance with one aspect of the present invention.

FIG. 17 illustrates a seller database stored in the central server in accordance with one aspect of the present invention.

DETAILED DESCRIPTION OF THE INVENTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the subject invention.

Figure 1:
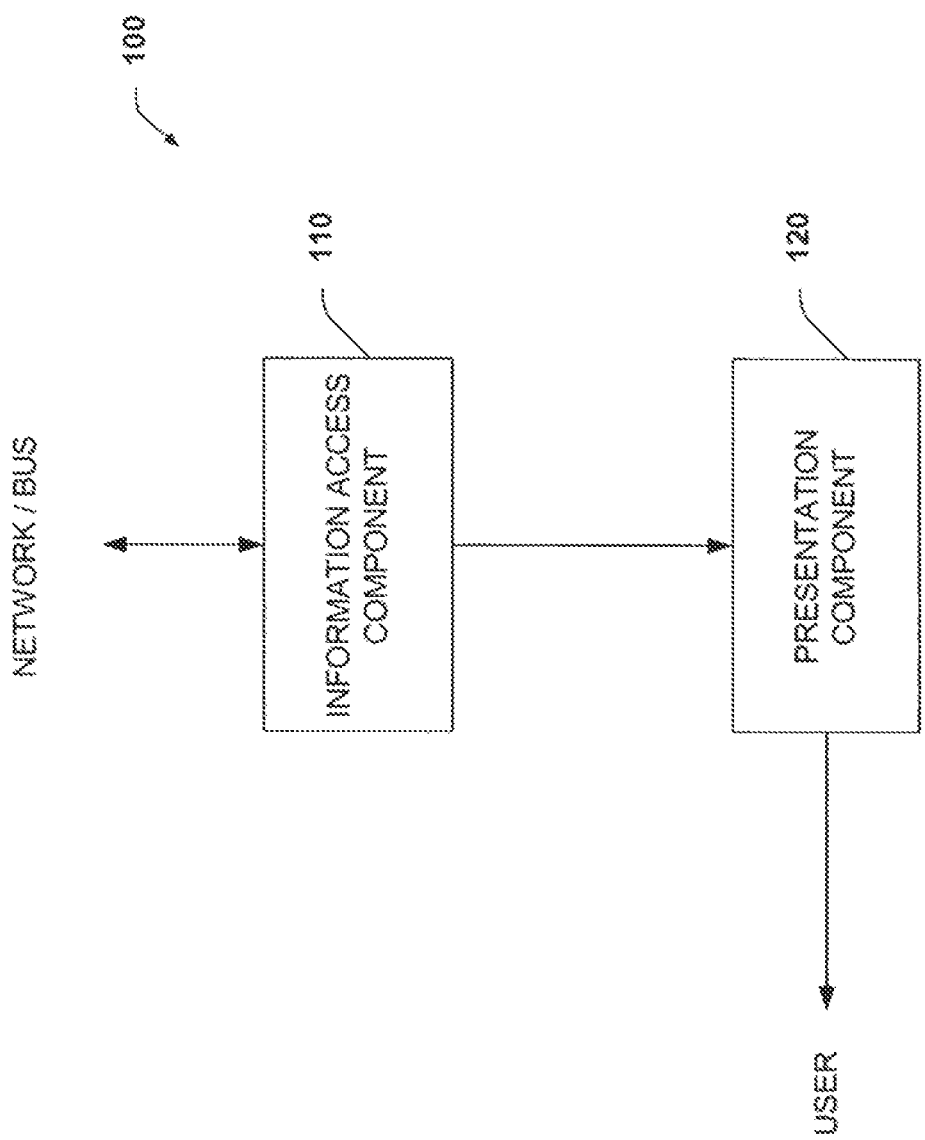
FIG. 1 illustrates a dynamic discount system in accordance with an aspect of the present invention.

Referring initially to FIG. 1, a dynamic discount system 100 comprising an information access component 110 and a presentation component 120 is illustrated according to an aspect of the present invention. The dynamic discount system 100 can be utilized to access offers such as, for example, derived from shopping bots, catalogs, etc.

The information access component 110 communicates with a network and/or a bus and receives information related to price curves, quantities, etc. established by a wide variety of users (e.g., suppliers). Thus, the information access component 110 can comprise a transmitter, receiver or both. For instance, the information access component 110 can be a receiver that obtains information wirelessly from a tower or a satellite.

Additionally, the information accessed via the information access component 110 is further provided to the presentation component 120. The presentation component 120 can comprise a display (not shown) to present information to a user and/or software to render the information into a displayable format. The display can provide audio information, visual information, touch, etc. to the user. Thus, information can be displayed to a user via the dynamic discount system 100. For example, the information access component 110 can receive updated price curves from a network, which can be provided to the presentation component 120. Furthermore, the presentation component 120 can display the updated price curves to the user.

By way of example, Enterprise Resource Planning (ERP) systems and a multitude of software vendors have attempted to bring into balance manufacturing supply with demand over time. Products, along with quantities ordered over time and order frequency, are tracked and evaluated. These programs can include scheduling software, ERP systems, forecasting methods, and, most recently, predictive analysis and demand algorithms, which help predict and manage estimated production. In many instances, these solutions have sought to estimate and respond to various demand scenarios and optimize return on assets or utilization rates while meeting customer demand regarding item, options and delivery schedules. In many instances, the production schedule can be managed to meet predicted or real demand. As a result, resources can then be effectively planned and managed.

Pricing software can be employed to optimize profit by understanding individual demand and costs to service a customer. A price is determined based on such characteristics. Pricing software can manage prices relative to individual customers. Price sensitivity tools, in addition to other metrics, can be provided to determine optimal price strategies and trade-offs.

The Internet has been a delivery tool to provide these solutions. New technologies such as wi-fi and pda's (personal digital assistants) can further extend the solutions throughout ever-larger geographic areas for this updated information on demand.

Demand aggregation, as described infra, has established a fundamental, yet revolutionary, difference in existing ERP and pricing software thinking Demand aggregation effectively enables a supplier to offer products, volumes, options, ship dates and price curves tied to the volume ordered by an entire group of unrelated buyers in pre-production or simply before the item has ever been produced. The exact number of items to be produced, the types and final price depend upon the quantity ordered. Furthermore, the supplier can provide multiple price curves and multiple ship dates at different thresholds for the same item to different buyers, essentially grouping buyers individually or in strategic sub-sets with a different set of products, options, and prices. Yet, inherent within the model set forth herein, every user (e.g., buyer) selecting the same ship date is helping other users (e.g., buyers and supplier) reduce cost to produce items in question. Demand is grouped among unrelated buyers across states, countries and continents to lower prices. Mass customization occurs while the Internet is utilized to group users in optimal economic ordering quantities.

Numerous options and features can be utilized upon this software platform including smart pricing modules, segmenting individuals into different groups based on their ordering history, smart shopping bots for buyers, etc.

Translation software is available to take existing product catalogs and other pertinent information and translate that into group dynamic price curves. This translation software is also available as an XML-based or other data exchange format that could allow the demand aggregation offer to be created by a series of queries (e.g., a series of "What if" questions that determine changes in volumes, products, options, price-curves, ship dates, . . . ) that could be used to automatically populate an offer form and be made available to potential and existing users with some screening filters offered to the supplier (e.g., D&B credit run on buyer first).

For instance, a company using any variety of pricing, ERP, catalog, etc. software can list 5,000 widgets for delivery in 5 days with a price per unit of $1.00. The demand aggregation translation software can translate the existing "what if 10,000 are ordered, what if 20,000 are ordered, what if 40,000 are ordered, etc." to create in real-time a price-discount curve tied to volume that can immediately be displayed for the buyers and compared to other available options.

The dynamic discount system 100 is an add-on feature that can be employed by a buyer to connect to offers presented by supplier(s) in real-time and other "spot" offerings derived from shopping bots, catalogs, etc.

Figure 2:
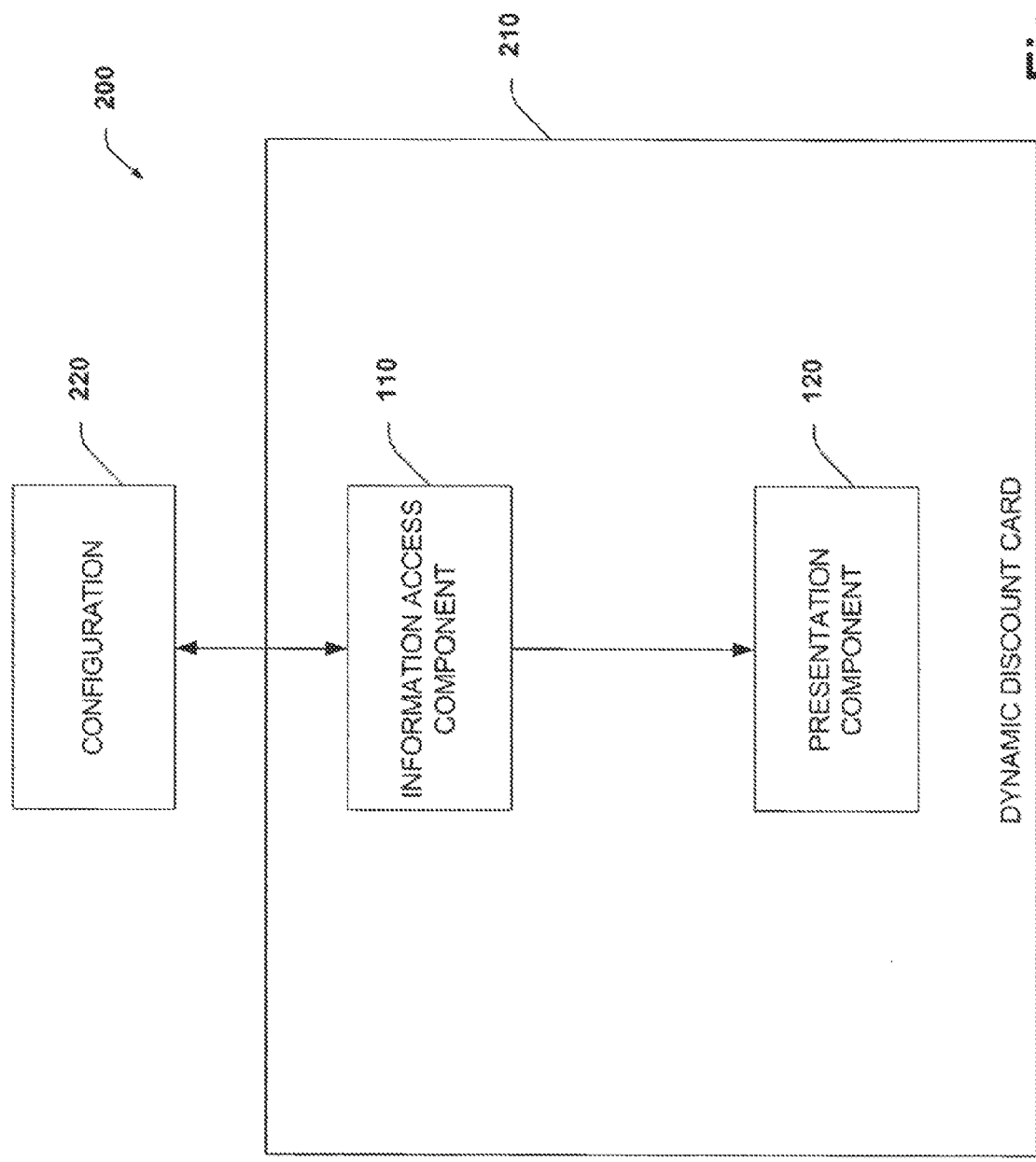
FIG. 2 illustrates a dynamic discount card system in accordance with an aspect of the present invention.

Turning to FIG. 2, depicted is a dynamic discount card system 200 according to an aspect of the present invention. The system 200 comprises a dynamic discount card (DDC) 210 that is coupled to a configuration component 220. Additionally, the dynamic discount card 210 comprises the information access component 110 and the presentation component 120 from FIG. 1.

The configuration component 220 facilitates configuration of the dynamic discount card 210. For example, the configuration component 220 can initialize the information access component 110 such that the information received by the information access component 110 corresponds to a user's profile; therefore, the user can receive information associated with a group of goods and/or services offered by a supplier(s). Additionally and/or alternatively, the configuration component 220 can be employed to preset a discount amount for a particular dynamic discount card 210. The configuration component 220 can configure the dynamic discount card 210 locally and/or remotely.

For purposes of understanding and not limitation, the following exemplary scenario is provided. The dynamic discount card 210 is mailed to a prospective buyer by a supplier, media outlet, etc. Selected suppliers send out electronic messages to the dynamic discount card 210 via the configuration component 220 (e.g., utilizing electronic, wi-fi, and other available methods) to provide updated product and price discount offers tied to volumes and ship dates/delivery dates that are stored on the card. Alternatively, the card 210 can be pre-loaded via a local configuration component 220 with default products and services at discount prices with only a buyer to enter the access code to initiate communication. In any event, the card 210 can show and/or recite the prices with a small voice activated chip (defaults can be set), the availability, and ship dates for the item in question, and other information via the presentation component 120.

Still yet another variation is for the discount card 210 to be loaded via the configuration component 220 with a profile of a cardholder (e.g., demographics, age, income, . . . ) that can interact with cable and other forms of communication (e.g., television). This information can be conveyed to a central database with pre-determined (e.g., based on age and income) protocols that show one or more advertisements to that individual or set of individuals holding respective cards 210. Likewise, specific prices (e.g., time based offer, discount, price curve . . . ) can be served up to the individual or set of individuals via the shared medium.

A targeted message can be cued and sent to the cardholder who is within range of that particular device. The customer, using the card 210, would then be able to respond to the offer as well as view the "localized" price and offer utilizing the presentation component 120. A default payment method can be stored in the card 210 with password protection or unique id coding and/or encryption technologies that enables the holder to execute the order at that time.

Figure 3:
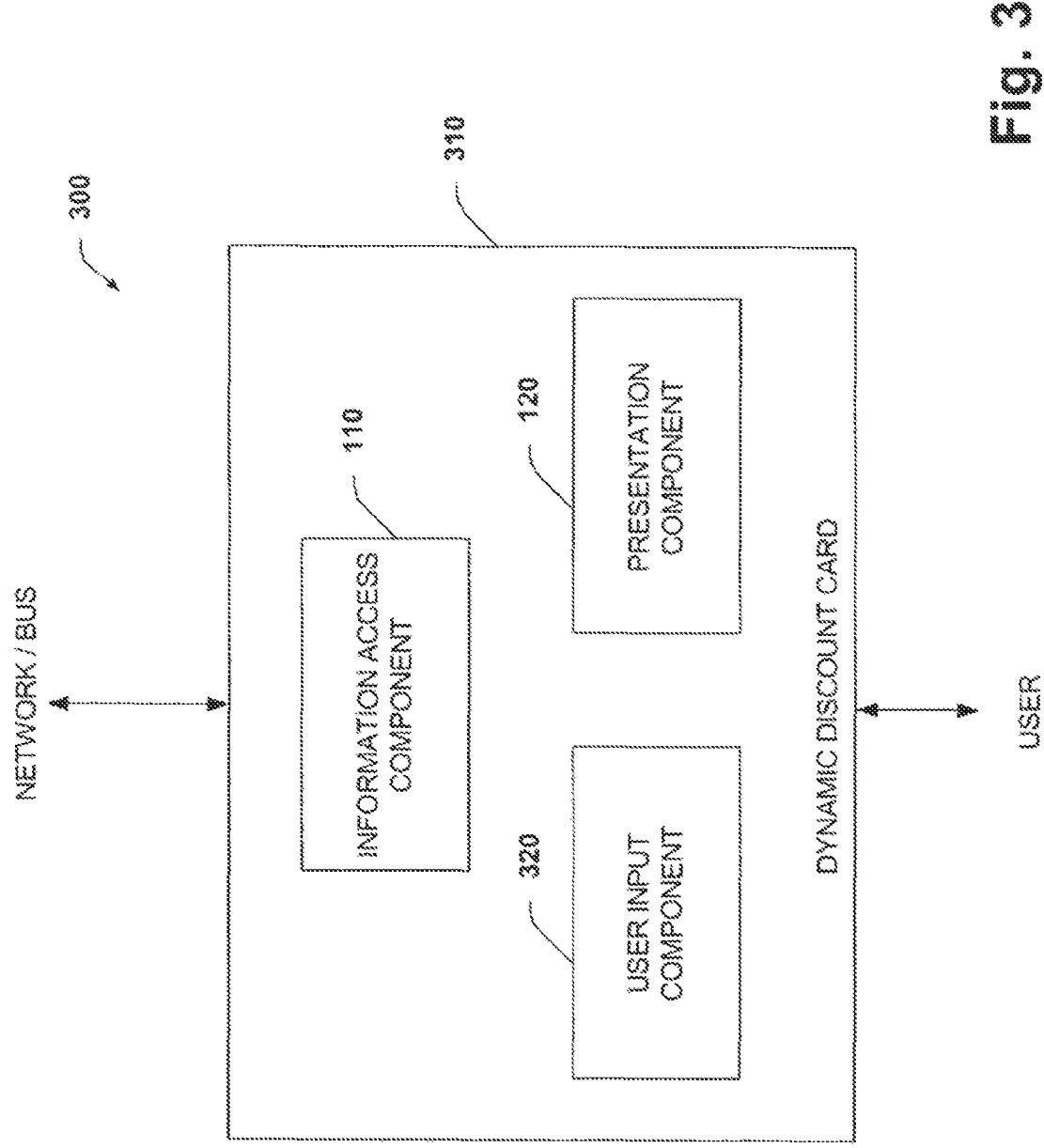
FIG. 3 illustrates a dynamic discount card system in accordance with an aspect of the present invention.

Referring next to FIG. 3, a system 300 for interacting with a buyer is illustrated according to an aspect of the present invention. The system 300 comprises a dynamic discount card 310 that can interact with a network/bus and a user. For example, the dynamic discount card 310 can receive information related to a good and/or service offered by a supplier from a wireless network. The information can be obtained by the dynamic discount card 310 via an information access component 110 and presented to a user utilizing a presentation component 120. The presentation component 120 can be, for example, software to convert the obtained information into a proper format and/or a hardware device such as a touch screen display, a display screen, a speaker, etc.

Furthermore, a user may interact with discount card 310 utilizing a user input component 320. For instance, the user input component 320 can be buttons on a surface of the card 310 to allow a user to view and manipulate information (thus, the user input component 320 can vary the information displayed via the presentation component 120). Additionally and/or alternatively, the user input component 320 can be a touch screen input and/or contain voice recognition software. Still further yet, the user input component 320 can be a magnetic strip on a surface of the card 310 to allow it to be read or programmed using a scanning device (not shown).

UNC codes, or other methods to confirm product specificity, can be used to send/retrieve specific information. Voice recognition, impulse recognition, icons, radio frequency ID, and other messaging devices can be utilized to represent the buyers' demand/order intention visibly and to optimize the capacity and time scenario faced by suppliers by communicating with offers as well as senders/receivers. The card 310 can interact with an ERP and pricing model software as it translates available inventory and potential inventory for an item with benefits of demand aggregation. The communication can occur between a network of items including but not limited to demand card(s), handheld device(s), product(s), skid(s), container(s), ERP system(s), and vehicle(s). Order volumes can be changed employing the user input component 320 and their impact seen upon the presentation component 120 as well. Supplier and buyer(s) are offered the ability to change their quantities to see how it impacts the system as a whole. A buyer can see the same product represented in four different locations and have a freight estimator included to show total cost. In this scenario, the price of an item can be more expensive in location B, but the proximity of the product in location A may be cause it to be shown first when sorted by price.

Viewing options on the card 310 displayed with the presentation component 120 can include: product code, picture, current price, future price, availability, shipping added and final price, list of suppliers, price history, ratings by supplier, sorting by various options, filters on certain suppliers, etc.

Furthermore, the current price can be shown with immediate delivery or a price curve (or some other graphical representation) shown along with the potential savings and the timeframe required. For example, the probability of the price dropping a certain percentage (e.g., 10%, 20%, . . . ) such that the buyer can make an informed choice of either ordering the item for immediate delivery or placing an order and waiting for a discount to occur over time.

Another option can be for the buyer to provide a counter-offer utilizing the user input component 320, for instance, stating he will pay a 15% premium and/or a set price if the availability is within a specified period or even immediately available. The suppliers of bots and price curves will have the ability to respond accordingly; however, the strength of the service is aggregating demand and the more time given the more advantage it is to not only the supplier but to the buyers as a group.

The user can control the information and/or format of the information presented by the presentation component 120 by utilizing the user input component 320. The user input component 320 enables the dynamic discount card 310 to filter, sort, track, and retrieve offers. Additionally, the card 310 can be updated utilizing the latest bots and new price curves submitted. The total demand data is also available to suppliers and buyers to review and see historical information and trends over time. A buyer can then order directly from the card utilizing the user input component 320 (e.g., by pressing order and confirm buttons, voice recognition, . . . ). Additionally, the card 310 can provide a buyer more specific information regarding payment, delivery date, and whether to send elsewhere as an FYI. The card 310 can also be integrated with a variety of items including but not limited to laptops, personal digital assistants, cell phones, car panels, transporters, segways, televisions, billboards with the code specified, id numbers, scanners, or wherever a receiving chip can receive updated signals from suppliers.

According to another example, a supplier can send out directed mail pieces with unique discount codes printed on the dynamic discount card 310 for a new buyer to try a particular product or service. In such a case, the card 310 can be activated only for a short-period but reflect changing discounts that are updated to the card 310 as an enticement to order from this supplier. In addition, messages can be sent to the dynamic discount card 310 from the network when product availability changes and prices need to be adjusted in real-time (e.g., available quantity is sold out, next price shown). Moreover, the card 310 could be programmed to reflect these changes as they are made by the supplier's selling software (dynamic discounts).

At the conclusion of the period, one type of card 310 can be simply discarded. Other cards 310 can be set-up to receive offers from new suppliers and their products and services via the network/bus. Still other cards 310 can interact with one another, providing comparative pricing information that can then be used and stored by the other person.

When a buyer orders, the price discount shown on the display (e.g., presentation component 120) can be confirmed and sent to the supplier. For example, the information access component 110 can send the order to the supplier via the network/bus. All order information can be sent as well within the same digital transfer although this is not necessary. Shipping options/preferences as well can be programmed or a default provided. If the price is aggregated with others during a set period of time, the final price can be determined by the total volume ordered and shown to the buyer at that time. All products, prices, volumes, suppliers, etc. can then be saved to the card 310 and/or sent to the user's home account on the Internet for future access, ported, etc.

An individual carrying a dynamic discount card 310 equipped with intelligence can be alerted to new price discounts and buying opportunities for select items that have been tagged by the user. Likewise, the same cards 310 can interface with one another, allowing a card to synch with another card. In such a case, a buying group (e.g., a purchasing co-op) could issue cards that carry their own dynamic discount cards 310 with select suppliers. The cards 310 thus can create a network of buyers with access to current and future prices. The buyers' cards 310 can automatically synchronize demand among members for these items and track the numbers of the group as a whole. A buyer could opt to accept this price or alternatively accept a different one shown by the presentation component 120.

In some cases as a variation, suppliers can choose to bid on the volume in real-time in which case a central buyer may be given authority to place the order on behalf of the group (with certain restrictions noted). In other cases, the issuing party is a publisher seeking to create value for readers while selling adjoining advertising space and supplier fees for posting offers by product search code.

The code can be identified per individual user and can track the origination of the program by each message sent by the supplier or originating source. For instance, one interpretation of the code 03380907 could as follows: 03 corresponds to a supplier (e.g., Acme Inc.), 3 is a type of message (e.g., an electronic message), 8 is an address code with city and state, 0 is a type of customer (e.g., a direct user), 9 could correlate to a time sent and discount period open (e.g., two weeks), and 0 could be an actual discount (e.g., 10%) and 7 can be a unique code assigned to a product. Additionally it should be noted that a picture of the item as well as technical data could be sent along with the closest location.

The entire code number could be entered by the prospect with a press of the button upon the user input component 320 to see the entire price curve, future discounts, and a variety of other items currently available with the demand aggregation. An accept offer icon can be available such that a customer can submit acceptance by pressing a button or confirming via voice activation number sent. Other available options include but are not limited to various alerts timed to price and time period elapsed.

The code can be entered verbally, scanned, called in, etc., but the translator is able to take the unique pulse or id number once used and collate all orders as they arrive. A tracking system can facilitate determining a current volume of items ordered as well as available quantity left. The supplier then has the ability to target different programs online or via voice activation by simply entering the corresponding code and making the change (e.g., all distributors receive an additional 5% off if the order is received within the next 24 hours).

Segments of DDC cardholders can be targeted as well based on a variety of preferences. For example, if a national equipment rental company has only a 35% rental rate in the Dallas market, an offer can be presented to the 1,000 cardholders within a 50 mile radius of the zip code indicating a new price curve or discount based on renting equipment from that location within the next 48 hours. A discount curve can be shown along with the final price that is calculated even after the product has been rented. In this case, a discount can be offered.

Management software enables the supplier to post offers to different DDC members segmented by any number of criteria including but not limited to geography in real-time, personal profile, the volume ordered previously, and product bundling (e.g., if item X is ordered, Y is now 10% off).

The card 310 can be scanned as well through a variety of swipes that can make the "purchase" along with proper payment and debit/credit information. A "final" price can be determined by expiration of a period as well as a final volume ordered by the group along with discounts given along the way. Any limitations can be recorded in the unique number including payment terms, available credit, etc.

The card 310 can be updated automatically as well for the customer and those customers who have not yet ordered but have indicated they want to be updated on the progress of an offer. Furthermore, an alert can be sent when there is price movement down (certain signal) or up (different signal). The available quantity can also be shown in real-time along with a purchase when volume reaches X or price equals Z. An auto-order can be placed or the user can select an "alert me before placing order" that responds in kind.

Multiple products and offers can be received, stored and retrieved as required. A screening filter is also available (e.g., mycard) utilizing the user input component 320 to select those product/service categories most interested by the cardholder. The cardholder has the ability to turn off the offers as well based on any number of criteria. The card 310 then saves these requests and does not translate their respective transmissions, but instead filters them out accordingly (suppliers can access this information). Filters can be engaged temporarily or longer. The card can be set-up by a myriad of ways that can be controlled by the provider of the card (e.g., no filters on select suppliers) or filtered by the buyer (purchasing co-op defaulting to certain suppliers over others). Furthermore, the cards 310 can interact with a central database of offers submitted by the supplier and organized by an indexed system that can be searched.

A supplier who issues a card 310 can be required to maintain a private password, code, etc. to access the card. While the discount cards 310 will interface with one another via various devices to update the latest prices and access codes, a provider of the card 310 can have a registration page and process that requires payment by the supplier to show the prices in real-time to the group of buyers. If a supplier purchases a product ID code to advertise, this can be seen on the display screen as well while the prices are being presented.

In addition, GPS can be utilized to interface with the cards 310 and show a graphical representation of everyone across the globe, their location, etc. A supplier may request and pay to send a message to a group of select customers within a geographical area at a certain time. Likewise, they may pay to see what buyers have ordered a certain UNC item over the past two months and resend a new special that will be positioned first when these individuals select to search the item next. Again, placement and positions can be sold by the UNC number, location, and many other criteria or filtered out.

For example, a buyer could pull out the card 310, enter a hotel location and specify the number of nights utilizing the user input component 320 and see via the presentation component 120 the list of available hotels along with those with price curves (current and future prices), the shopping bots (current price), other opportunities (co-op price), or last minute opportunities provided by other sources. The card 310 would enable the buyer to see a comparison of the modules and place an order with one of his/her choice.

Dynamic discount cards 310 can also interface with the equipment and/or product themselves. In time, chips embedded in the item will respond to either the equipment as it is producing the product in question and/or the product as it is being delivered to inventory. The system can return price and an availability point according to this system as well which may be aggregated or unaggregated. An option can exist to calculate the transportation/freight cost and show the final price and availability to the buyer. The buyer can accept or reject this offer.

Dynamic discount cards 310 can also be sent to select buyers with certain built-in discounts based on company size, negotiated prices already established, etc. but will still integrate with the demand aggregation concept and shopping bots results. For example, a large buyer can have dynamic discount cards 310 with a supplier's item showing a price of X. The card 310 receives dynamic pricing data from that supplier via the information access component 110 and, in the event the price drops below X, the buyer(s) is alerted to this opportunity. Another example is to have a pre-negotiated "5% below the lowest price made public," which means the card 310 would register a price that is 5% below the lowest price available from this supplier with the DDC 310 for that item. The price for this item(s) is automatically calculated by the card 310 and shown to all buyers with the presentation component 120. Yet another example is the card 310 that has a priority over other buyers by seeing the offer in advance. An offer would be sent via a signal from the network/bus to the DDC that denotes it as a "special" offer with limited review time.

A cardholder has the ability to search by product category, product item, supplier by name, and a variety of other options. The search can be initiated by the user via the user input component 320.

In yet another example, a publisher, portal, search engine, etc. providing the dynamic discount cards 310 can have the activities of every member tracked accordingly. For instance, if two million dynamic discount cards 310 are issued and their activities are stored, that publisher has the ability to track in real-time the demand and purchasing activity online. This information can be bundled and sold to suppliers, advertisers and other interested parties. The recipients of the DDC's 310 are notified of the terms and conditions surrounding this particular card and should accept or reject these conditions. Thus, how this information will be used is important for buyer as well as suppliers involved. The buyer activity may be tracked in a wide range of segments including but not limited to:

Geography
Items (product codes as mentioned earlier)
When card was activated and activity since
Purchase prices and quantities
How purchased—demand aggregation, shopping bots, catalog access, etc.
Feedback on supplier recorded and tracked
Ancillary products ordered
Pricing fluctuations
Product history
Personal preferences—filled out at time of card receipt Another variation is for the card 310 to simply assign a number to a particular discount % once confirmed. For instance, if a buyer selects an item from the DDC 310 and a price is shown along with a discount, a quick code can be generated. That code can then be saved and used by the buyer when he/she places the order (can be at a later time, attached to a purchase order, referenced at time of ordering, etc.). This code can be good for a certain time period (e.g., 24 hours) as specified by the supplier. Again, different variations exist to allow for multiple codes to be issued to different buyers. If the code is not used within the specified time, the offer can lapse accordingly. The DDC 310 records and saves pertinent information on the buyer as well as the central database of all DDC 310 holders.

Yet another example, a supplier can see the buyer has responded to 5 offers but has not placed a single order. The supplier can seek to have this buyer blocked from the offer or otherwise restrict the buyer from placing an order.

Figure 4:
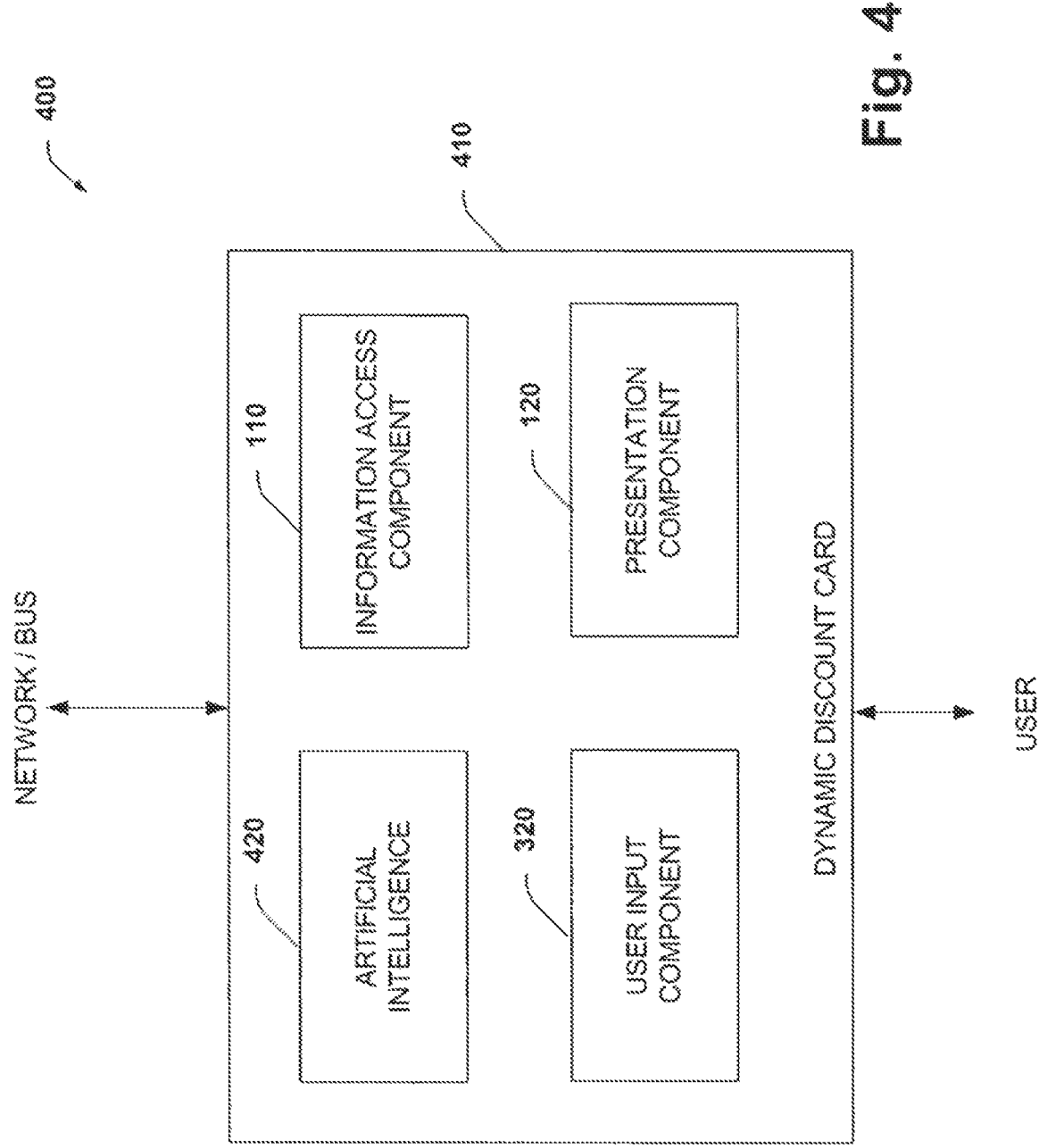
FIG. 4 illustrates a dynamic discount card system in accordance with an aspect of the present invention.

Turning to FIG. 4, illustrated is a dynamic discount card system 400 according to an aspect of the present invention. The system 400 comprises a dynamic discount card 410 that receives information to a user from a supplier(s) via a network/bus and transmits information from the user to the supplier(s). The dynamic discount card 410 comprises an information access component 110, a presentation component 120, and a user input component 320 as described supra. The dynamic discount card 410 can further comprises an artificial intelligence component 420.

The artificial intelligence component 420 can make inferences regarding information to display upon the card 410 utilizing the presentation component 120. Additionally and/or alternatively, the artificial intelligence component 420 can infer a user's intended input via the user input component 320. Therefore, the artificial intelligence component 420 can effectuate altering the displayed information upon the presentation component 120 in accordance with the performed inference. Alternatively, the artificial intelligence component 420 can accept an offer from a supplier based upon the inference. The artificial intelligence component 420 can employ techniques such as, for example, Bayesian networks, support vector machines, etc. to perform such inferences. However, the present invention is not limited to these techniques to perform such inferences.

Figure 5:
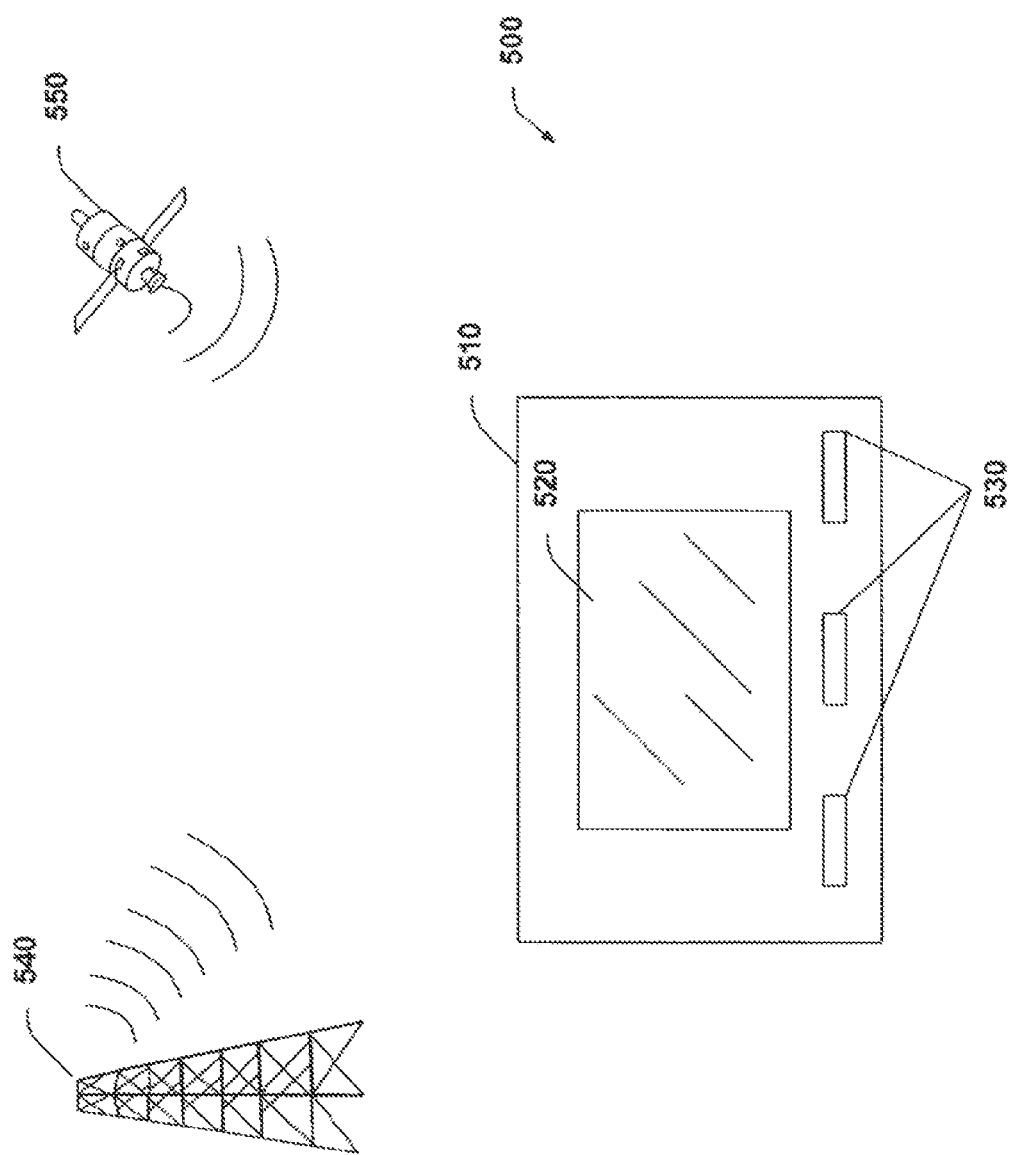
FIG. 5 illustrates a dynamic discount card system in accordance with an aspect of the present invention.

Turning now to FIG. 5, illustrated is a dynamic discount card system 500 according to an aspect of the present invention. The system 500 comprises a dynamic discount card 510, which has embedded intelligence/software that allows it to access the price curves, quantities, etc. established by a wide variety of supplies as well as display results of other standard shopping bots that seek to find the lowest prices for the same product. For example, the card 510 can be a thin card with a visual display panel 520 thereupon. The card 510 can receive and display real-time updates from the price curves and show a variety of displays automatically (e.g., graphs, low to high, supplier's location . . . ). Additionally, a user can interact with the dynamic discount card 510 by utilizing input devices (e.g., user input component 320) such as buttons 530. The dynamic discount card 510 also can receive and transmit information. For example, the dynamic discount card 510 can receive/transmit information wirelessly utilizing a tower 540 and/or a satellite 550.

Figure 6:
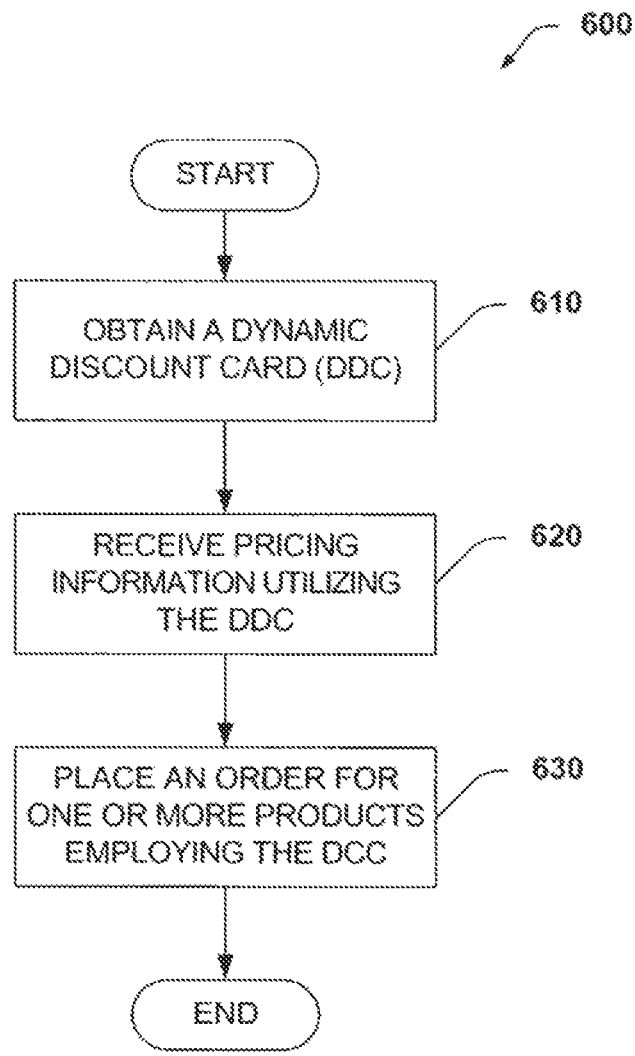
FIG. 6 is a flow diagram of a methodology for transacting business electronically is illustrated in accordance with an aspect of the present invention

In view of the exemplary systems described supra, a methodology that may be implemented in accordance with the present invention will be better appreciated with reference to the flow chart of FIG. 6. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Turning to FIG. 6, a methodology 600 for transacting business electronically is illustrated in accordance with an aspect of the present invention. At 610, a dynamic discount card is obtained. At 620, the discount card is utilized to obtain pricing information about one or more products. As noted supra, the information can be obtained via the information access component 110 (FIG. 1). For example, the information can be obtained wirelessly and/or from a satellite. Furthermore, the information can be displayed to a user by employing a presentation component 120 (FIG. 1). Finally, at 630, the discount card is employed to place an order for one or more products. By way of example, the order can be placed by a user via a user input component 320 (FIG. 3).

The aforementioned systems and methods can be employed within numerous environments. The dynamic discount card systems and methods described supra can be utilized in connection with the following systems and methods.

Figure 7:
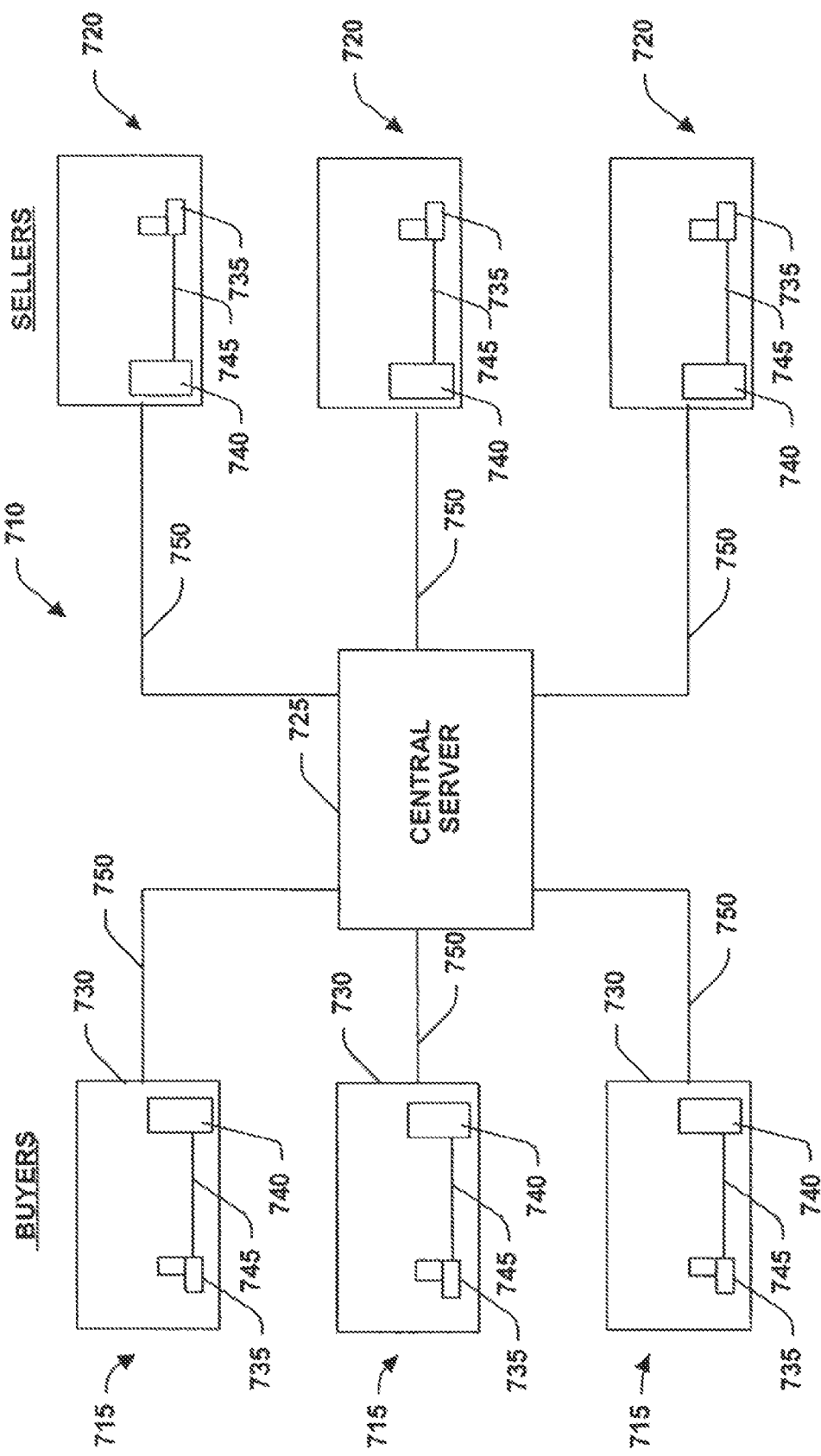
FIG. 7 illustrates a diagrammatic view of a system for electronically conducting business in accordance with one aspect of the present invention.

Referring to FIG. 7, a system 710 is shown in which multiple buyers 715 and sellers 720 are electronically linked via a central server 725. As discussed in more detail below, the central server 725 is configured to provide the buyers 715 and sellers 720 with a convenient forum in which to buy and sell goods in accordance with a multiple criteria buying and selling methodology described herein. The forum may be, for example, a pre-established Internet web page where sellers 720 are able to post product information and the buyers 715 are able to order products. The multiple criteria buying scheme calls for a seller 720 to post a number of deals for a given product, which vary according to different offering criteria defining the limits of a number of selling criteria, such as for example, price, volume, quality and delivery time. Each buyer 715 is able to enter a range of criteria that the buyer would require for a deal to be made. A list of sellers and prospective deals offered by these sellers is generated for the buyers to review. Each buyer 715 can then review the list of deals and choose a deal based on the buyer's particular needs. In this manner, each of the buyers 715 can be certain that particular thresholds have been met and also be guaranteed of completing a deal.

It is to be appreciated that the present invention has wide applicability to the purchasing and/or selling of a variety of different products and/or services. For example, the present invention may be applied within the context of purchasing and/or selling airline tickets wherein buyers' criteria may include, for example: (1) reputation of airline; (2) reliability; (3) timeliness; (4) price; (5) number of alternative flights; (6) comfort; (7) quality of service; and (8) quality of foods. The sellers' criteria may include, for example: (1) volume of tickets; (2) buyer's versatility in time schedule; (3) buyer's method of payment; etc.

The present invention may also be applied in the context of purchasing and/or selling an automobile wherein the buyer's criteria may include, for example: (1) reputation of automobile manufacturer; (2) reputation of dealer; (3) price of automobile;

(4) delivery options; (5) automobile availability; (6) safety; and (7) financing terms; etc. While, the seller's criteria may include, for example: (1) buyer's creditworthiness; (2) desired finance terms; (3) delivery requests of buyer; (4) delivery dates; etc.

Thus, the present invention intends to allow buyers and/or sellers of products and/or services to pre-select a plurality of criteria prior to negotiating a deal for the product and/or service. Of course the pre-selected criteria will vary depending on the particular product and/or service. The scope of the present invention as defined in the hereto appended claims intends to include any product and/or service (and plurality of pre-selected criteria associated therewith) suitable for deal-making in accordance with the present invention.

Each of the buyers 715 and sellers 720 may access the central server 725 in any of a variety of ways. For example, in the present aspect, each buyer 715 and seller 720 is shown to be part of separate establishments 730 which include one or more respective computer systems 735 and local servers 740. The computer systems 735 may, for example, be a desktop or laptop computer with a local area network (LAN) interface for communicating over a network backbone 745 to the local server 740. The local servers 740, in turn, interface with the central server 725 via a network cable 750 or the like. It will be appreciated that while the present aspect depicts the computer system 735 communicating with the central server 725 via hardwired network connections, in an alternative aspect the computer system 735 may interface with the central server 725 using a modem, wireless local area and/or wide area networks, etc. Further, it will be appreciated, that while the buyers 715 and sellers 720 are shown to communicate with the central server 725 via different computer systems 735, it will be appreciated that the buyers 715 and/or sellers 720 may access the central server 725 from the same computer system 725.

Figure 8A:
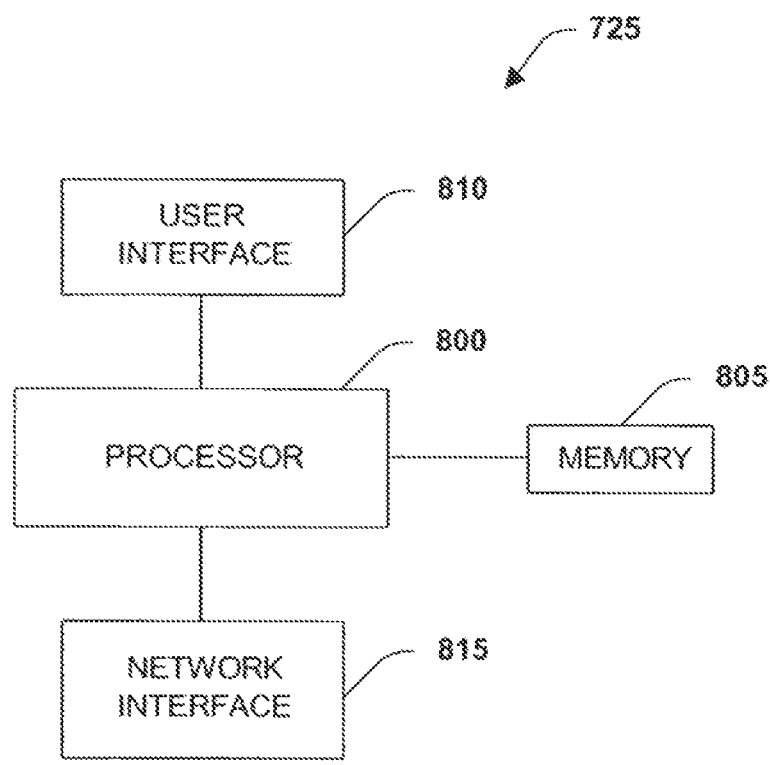
FIG. 8a illustrates a block diagram of a central server in accordance with one aspect of the present invention.

Turning now to FIG. 8a, a block diagram of the hardware components of the central server 725 is shown. In particular, the central server 725 includes a central processor 800 for performing the various functions described herein. A memory 805 is coupled to the processor 800 and stores operating code and other data associated with the operations of the central server 725. A user interface 810 is also coupled to the processor 800 and provides an interface through which the central server 725 may be directly programmed or accessed. The user interface 810 may, for example, be an alphanumeric keyboard and mouse. A network interface 815 coupled to the processor 800 provides multiple connections for transceiving information with buyers 715 and sellers 720 over the network cables 750.

Figure 8B:
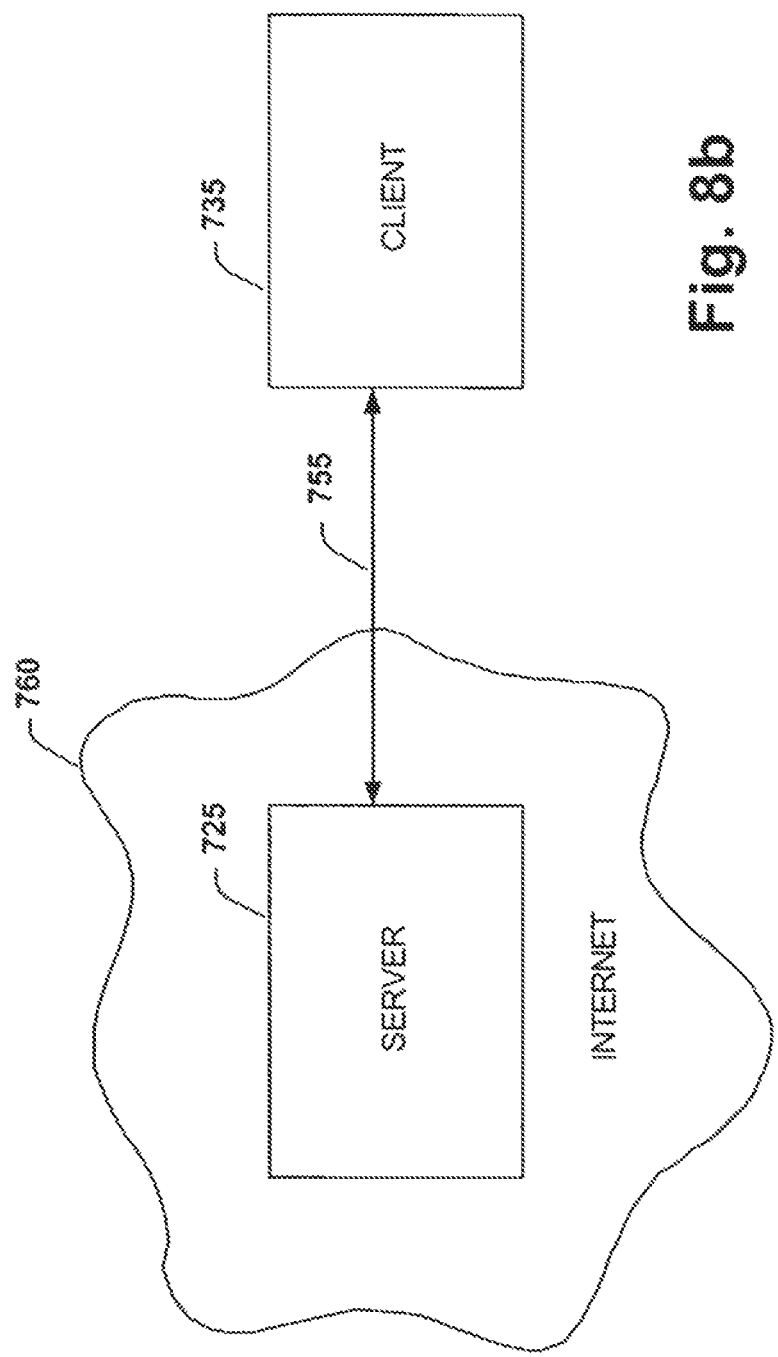
FIG. 8b is a schematic illustration of a client computer operatively coupled to a server computer system in accordance with one aspect of the present invention.

As previously stated, the present invention could take advantage of the wide availability and versatility of the Internet. Referring to FIG. 8b, a schematic block diagram that depicts an environment of interest to one aspect of the present invention. The client computer system 735 is shown connected to the central server computer system 725 that is part of the Internet 760. The client computer system 735 and server 725 are connected via an Internet connection 755 using a public switched phone network, for example, such as those provided by a local or regional telephone operating company. The Internet connection 755 may also be provided by dedicated data lines, Personal Communication Systems ("PCS"), microwave, or satellite networks, for example, or any suitable means. It is to be understood that the terms client and server are to be construed in the broadest sense, and that all such constructions of the terms are intended to fall within the scope of the hereto appended claims.

Figure 9:
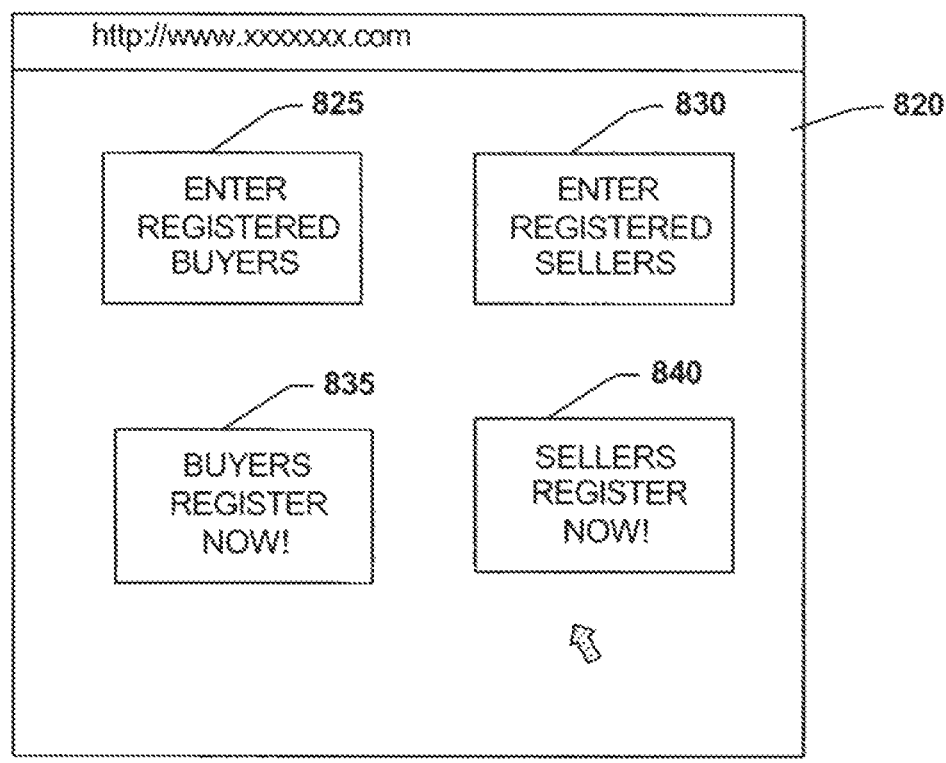
FIG. 9 illustrates a web page providing options to buyers and sellers desiring to conduct business electronically in accordance with one aspect of the present invention.

Turning now to FIG. 9, an exemplary Internet web page 820 which provides buyers 715 and sellers 720 with access to a forum for conducting business using the multiple criteria buying methodology described in detail below, is shown. The web page 820 is shown to include hyperlinks for handling both registered and un-registered buyers and sellers of products. For example, as shown in FIG. 9, registered buyers may select a hyperlink to a registered buyer login screen via hyperlink 825 while non-registered buyers may select a hyperlink to a non-registered buyer registration screen via hyperlink 835. Similarly, registered sellers may select a hyperlink to a registered seller login screen via hyperlink 830, while non-registered sellers may select a hyperlink to a non-registered seller registration screen via hyperlink 840. While the present aspect illustrates separate hyperlinks for buyers and sellers, it will be appreciated that such hyperlinks could alternatively be combined and the status of buyer or seller could be determined during a later stage in the login procedure.

Figure 10A:
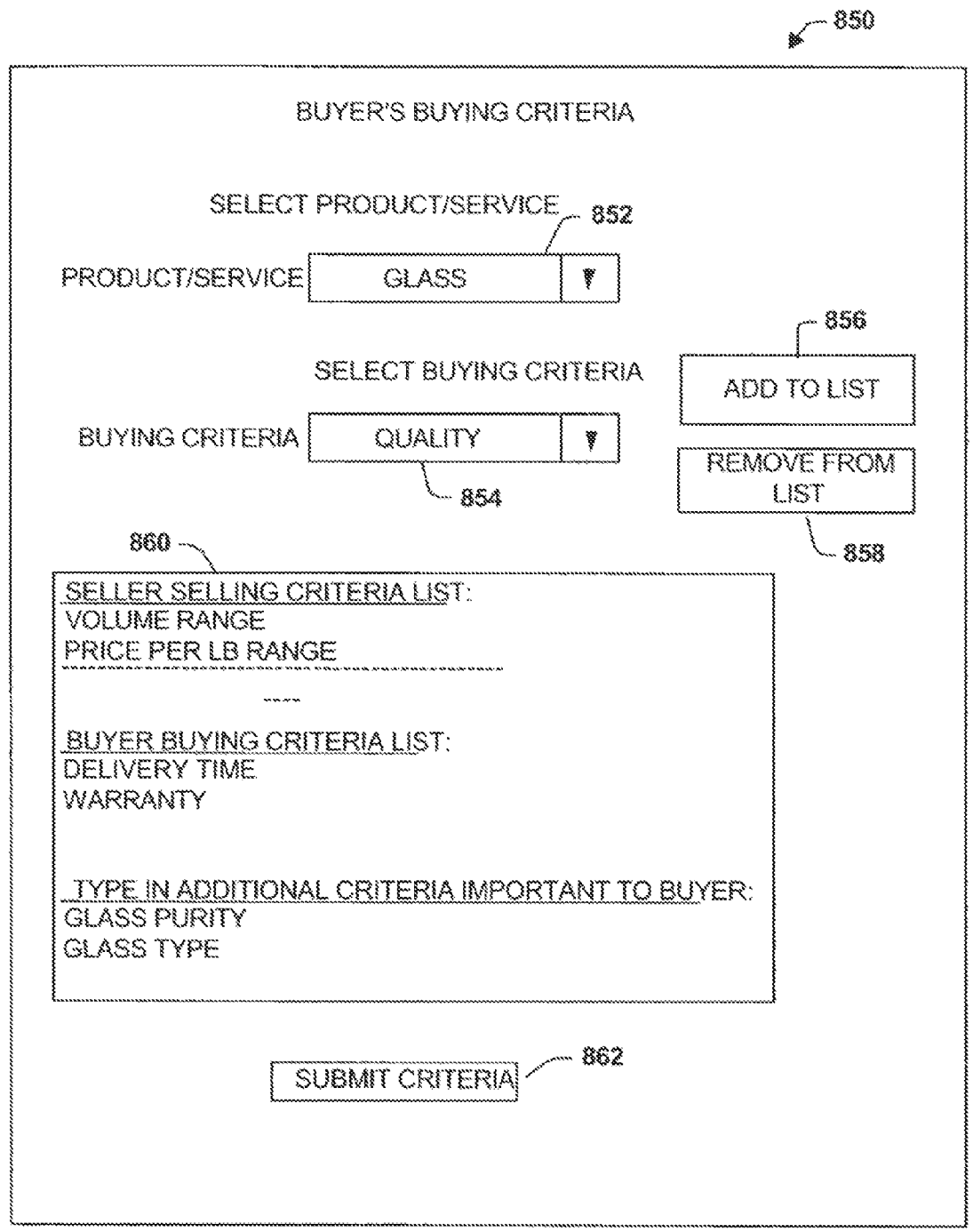
FIG. 10a illustrates a buyer's buying criteria input screen in accordance with one aspect of the present invention.

Turning now to FIG. 10a, in accordance with one aspect of the present invention, registered buyers 715 enter several product buying criteria into a "Buyer's Buying Criteria" input page 850. The buyer 715 selects a product or service from a list in a scroll down menu 852. It should be appreciated that the list on the scroll down menu 852 could include any number of related or non-related goods and services only limited by the size of a database used in accordance with the present invention. Upon selecting a product or service (e.g., glass) from the scroll down menu 852, a list of seller criteria automatically appears in a window 860. The list of seller criteria appearing in the window 860 is the minimum inputs to be provided by the buyer to obtain a deal listing. These minimum inputs are decided by the class of sellers selling the individual product or service and/or decided by the system administrator of the system. The buyer 715 can then begin adding buyer buying criteria by selecting the criteria from a scroll down list 854, and clicking on an "Add to List" button 856 with a computer mouse (not shown), for example. If the buyer 715 desires to remove a buyer buying criteria, it is only necessary to highlight the criteria in the window 860 and click on a "Remove from List" button 858. Once the list is completed, the buyer 715 may add additional criteria thought to be important to the buyer not in the selection of choices. These additional criteria will not be used by the buyer in this particular deal search, but will be provided to the sellers, so that they can be alerted of these additional criteria important to the buyer. The seller may opt to add to the selectable choices these additional buyer's buying criteria at a later time. Once the complete custom buyer buying criteria list is completed, the buyer can click on the "Submit Criteria" button 862 for submission of the buyer's buying criteria to build a "Buyer's Product Ordering Criteria" input screen 865, as illustrated in FIG. 10b.

Figure 10B:
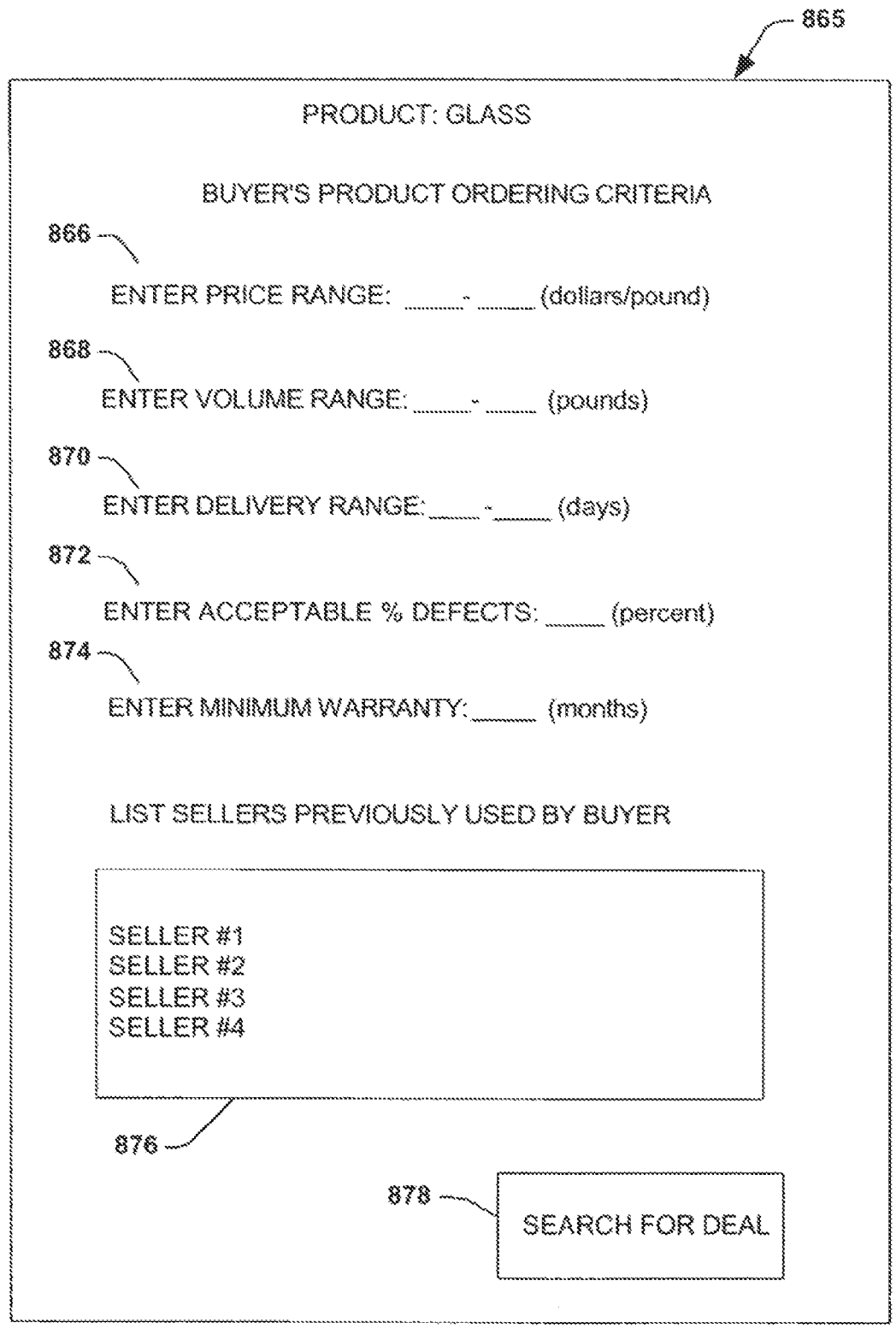
FIG. 10b illustrates a buyer's product ordering criteria input screen in accordance with one aspect of the present invention.

Turning now to FIG. 10b, in accordance with one aspect of the present invention, registered buyers 715 enter several product ordering criteria that would be acceptable to the buyer 715 on the "Buyer's Product Ordering Criteria" input screen 865. In this particular example, the buyer 715 is looking to purchase raw glass by the pound, however, many different types of products and services could be purchased/sold using the present invention. The buyer's ordering criteria of this example includes: price range 866 in dollars per pound; volume range 868 in number of pounds; delivery range 870 in days; the acceptable % of defects 872 in percent; and the minimum required warranty 874 in months. The buyer 715 can then list the names of the sellers 720 in the window 876 that the buyer 715 has bought products from previously, so that the buyer 715 can be entitled to any good customer or multi-purchase discounts offered by the sellers 720. Once the buying ordering criteria are entered, the buyer can search for deals by clicking on the "Search for Deal" button 878 on the computer screen using the computer's mouse. The present invention then utilizes a search engine to search through a database of deals offered by various sellers of the product, and provides an output of those deals to the buyer that matches the buyer's ordering criteria by outputting a list of these deals on a "Deal Matching Ordering Criteria" output page 880, as shown in FIG. 10c.

Figure 10C:
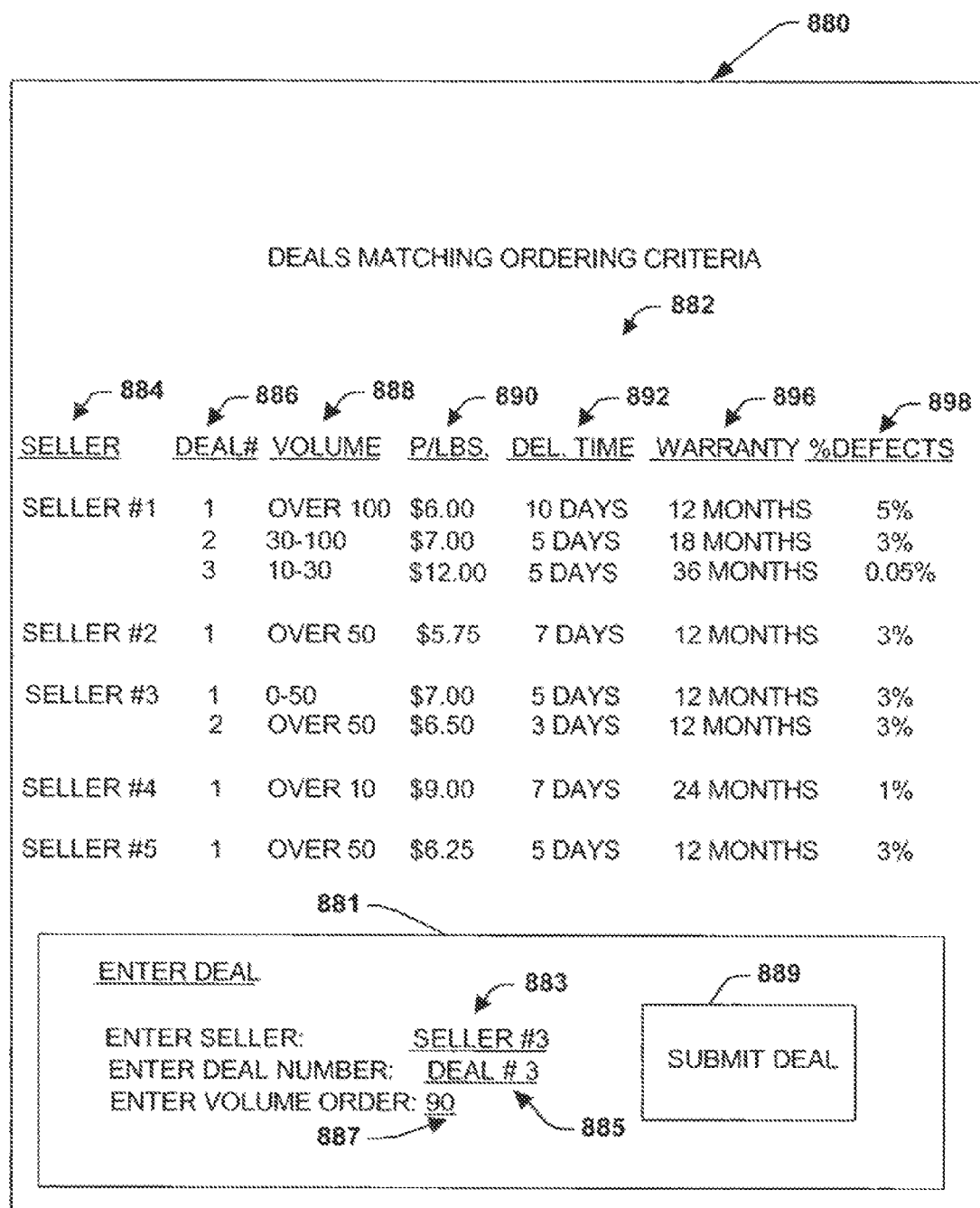
FIG. 10c illustrates a list of sellers' deals matching the buyer's product ordering criteria in accordance with one aspect of the present invention.

Turning now to FIG. 10c, in accordance with one aspect of the present invention, registered sellers 720 set up a variety of deals 882 by which registered buyers 715 are able to order products. As will be discussed in more detail below, the deals 882 of the present aspect are set up to display the following information which is input from the seller 720 and/or calculated by the processor 800 of the central processor 725 according to the deal 882, which includes: a seller name 884; a deal number 886; a volume ordering range required 888 to obtain a current price/pound level 890; an expected delivery time 892; a warranty period 896; and a percentage of defects 898 of the product the buyer 715 can expect to receive in a given order. Based on such information, buyers 715 can make an informed decision as to whether they desire to commit to an order on a particular deal based on the criteria that is important to that particular buyer. If a buyer 715 desires to place an order, the buyer 715 inputs a seller 883, a deal number 885 and a volume order 887. The buyer 715 then clicks on the "Submit Deal" button 889 with a mouse pointer, for example, on the computer display and the deal is finalized.

Figure 11:
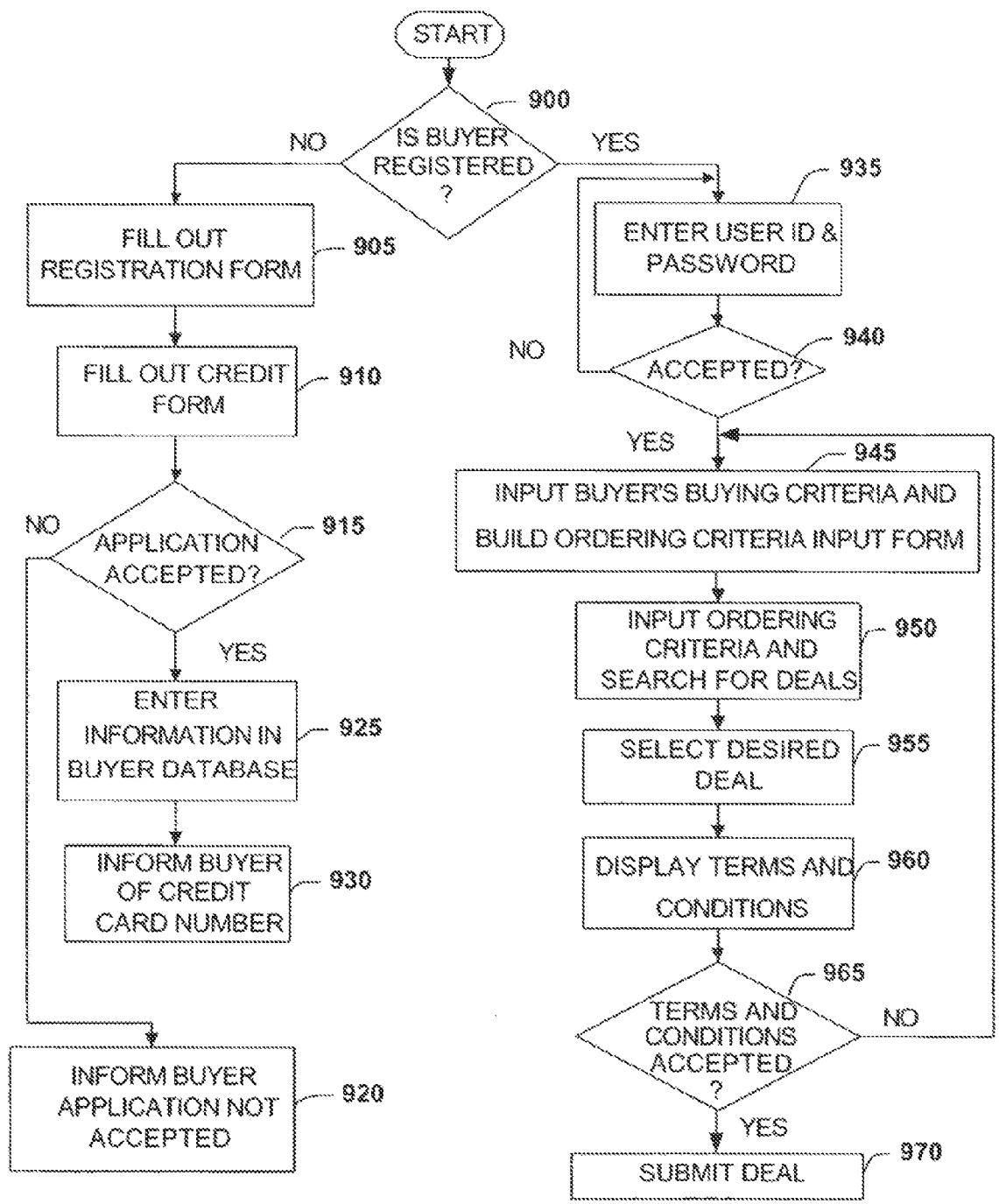
FIG. 11 illustrates a flow chart for a buyer desiring to conduct business electronically in accordance with one aspect of the present invention.

Turning now to FIG. 11, the general steps taken by a buyer 715 entering the web page 850 is shown. More particularly, in step 900 it is initially determined whether a buyer 715 is registered or not. If the buyer 715 is not registered, the buyer 715 selects hyperlink 835 (FIG. 9) and proceeds to step 905. In step 905 the processor 800 of the central server 725 requests that the buyer 715 fill out a registration form. For example, the buyer 715 is requested to fill out a registration form 908 such as that shown in FIG. 12. In the present example, the registration form 908 requests that the buyer 715 enter the following information: buyer name; address; primary contact person; phone; fax; e-mail; short description of company; preferred login user name; and preferred password. With respect to the user name and password, the processor 800 is configured to determine whether the selected user name and password combination are available and, if not, to prompt the buyer 715 to enter a new user name and password until an available combination is selected.

In step 910 (FIG. 11), the buyer is requested to fill out a credit card application so that purchases made on the web site may be immediately approved. The credit card registration and approval process may be accomplished via a hyperlink to one of various electronic credit card approval agencies which check the buyer's credit rating and set up a merchant account with a line of credit. For example, an electronic credit card approval agency which may be used in conjunction with the present invention can be found on the Internet at http://www.interent-ecommerce.com. Next, in step 915, the processor 800 determines if the credit card application has been approved by the electronic credit card approval agency. If the credit card application has not been approved, the processor 800 proceeds to step 920 where a message is sent back to the buyer 715 indicating regret that they have not been approved for a line of credit and therefore have not successfully completed the registration process. In step 920, a customer service telephone number also is provided to the buyer 715 in case the buyer has questions and/or desires to pursue registration further.

If in step 915, the processor 800 is informed that the buyer 715 has been provided a line of credit and a credit card number has been issued, the processor 800 proceeds to step 925. In step 925 the buyer information from the registration form 908 and the newly issued credit card number are stored in a buyer database 970 (FIG. 13) in the memory 805 of the processor 725 (FIG. 8a). Next, in step 930, the processor 800 is configured to provide the buyer 715 with the newly issued credit card number so that the buyer 715 is able to purchase products and/or services. Furthermore, the processor 800 is configured to provide a report to the system administrator who then mails a confirmation copy of the buyer's information stored in the buyer's database to the buyer 715. This completes the buyer's registration process.

Continuing to refer to FIG. 11, if in step 900, a buyer has already registered, the buyer 715 may login as a registered user by selecting the registered user hyperlink 825 (FIG. 9). Once selected, the processor 800, in step 940 prompts the buyer 715 to enter a user ID and password. Upon entry of such information, the processor 800 in step 940 verifies the user ID and password with those stored in the buyer database 970 (FIG. 13). If the user ID and password entered by the buyer 715 does not match any entry in the buyer database 970, the processor 800 in step 940 returns to step 935 for re-entry of such information. If, however, in step 940, a valid user ID and password are entered, the processor 800 proceeds to step 945.

In step 945, the processor 800 provides the buyer 715 with a buyer's buying criteria input screen where the buyer 715 is able to enter a variety of buying criteria that is important to that particular buyer 715. The buyer 715 selects a plurality of buying criteria and submits the criteria, so that the system can build an input ordering criteria form. In step 950, the buyer 715 enters the range of ordering criteria that is acceptable to the buyer in the input ordering criteria form, and then submits these criteria causing the system search engine to match the ordering criteria with a list of seller deals in a seller deal database. The search engine then lists the seller deals matching the buyer's buying and ordering criteria. As discussed above, the deals 882 provided to the buyer 715 provide the buyer 715 with information regarding the sale of a particular product such as, for example, the volume range to get a particular price per pound, the delivery time, the warranty period and the percentage of defects in each order that a buyer can expect. In order to allow a buyer to quickly find deals 882 of interest, the processor 800 in step 945 provides the buyer 715 with the input "Buyer's Buying Criteria" input screen 850, so that active deals 882 of interest may be found.

Once a search is completed, the buyer 715 in step 950 is able to select a desired deal 882 from the results obtained. For example, the buyer 715 may choose a desired deal because it has a faster delivery time than the other deals. The buyer 715 may choose a deal because it has a low percentage of defects in the goods, or has a longer warranty than other goods. Regardless of the deal, the buyer 715 may choose, the buyer 715 can make an informed decision based on a variety of buying criteria. If the buyer 715 is unsatisfied with the search results or simply desires to re-perform the search, the buyer 715 at any time is able to return back to a previous screen selecting the "back" function available using an Internet browser such as, for example, Microsoft Internet Explorer, Netscape, etc. Additionally, a hyperlink to various screens, such as the search screen, preferably is provided on each web page.

Upon selecting a deal 882, the processor 800 in step 955 displays a page of standard terms and conditions which the buyer 715 must agree to prior to completing the deal. The terms and conditions relate to the terms governing the sale of the product or service according to which both the buyer and seller are willing to conduct business. If the terms and conditions are not accepted, the processor 800 returns the buyer 715 to step 945, so that another deal 882 may be selected and/or another search may be performed. If, however, in step 960 the terms and conditions are accepted, the processor 800 proceeds to allow the buyer 715 to complete the deal in step 965.

Figure 14A:
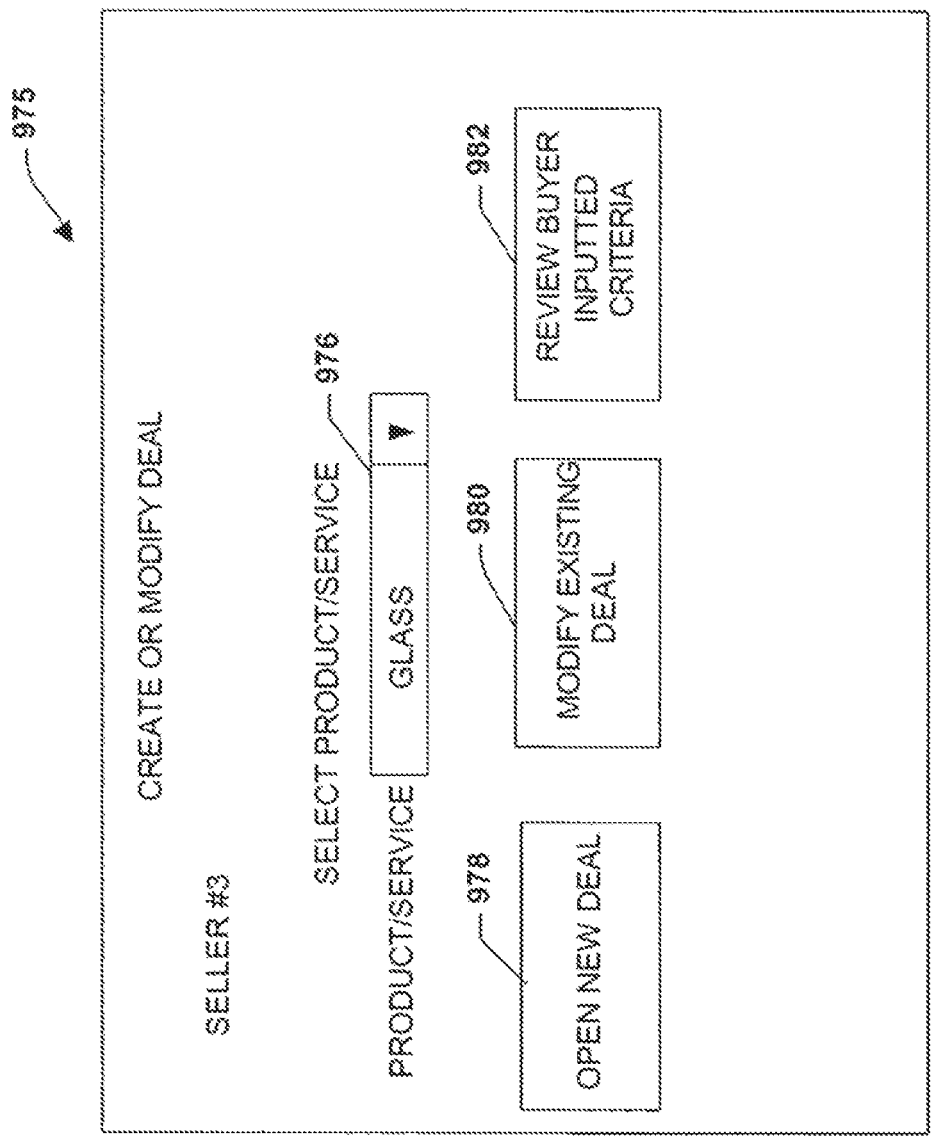
FIG. 14a illustrates a web page for a buyer to create or modify a deal in accordance with one aspect of the present invention.
Figure 14B:
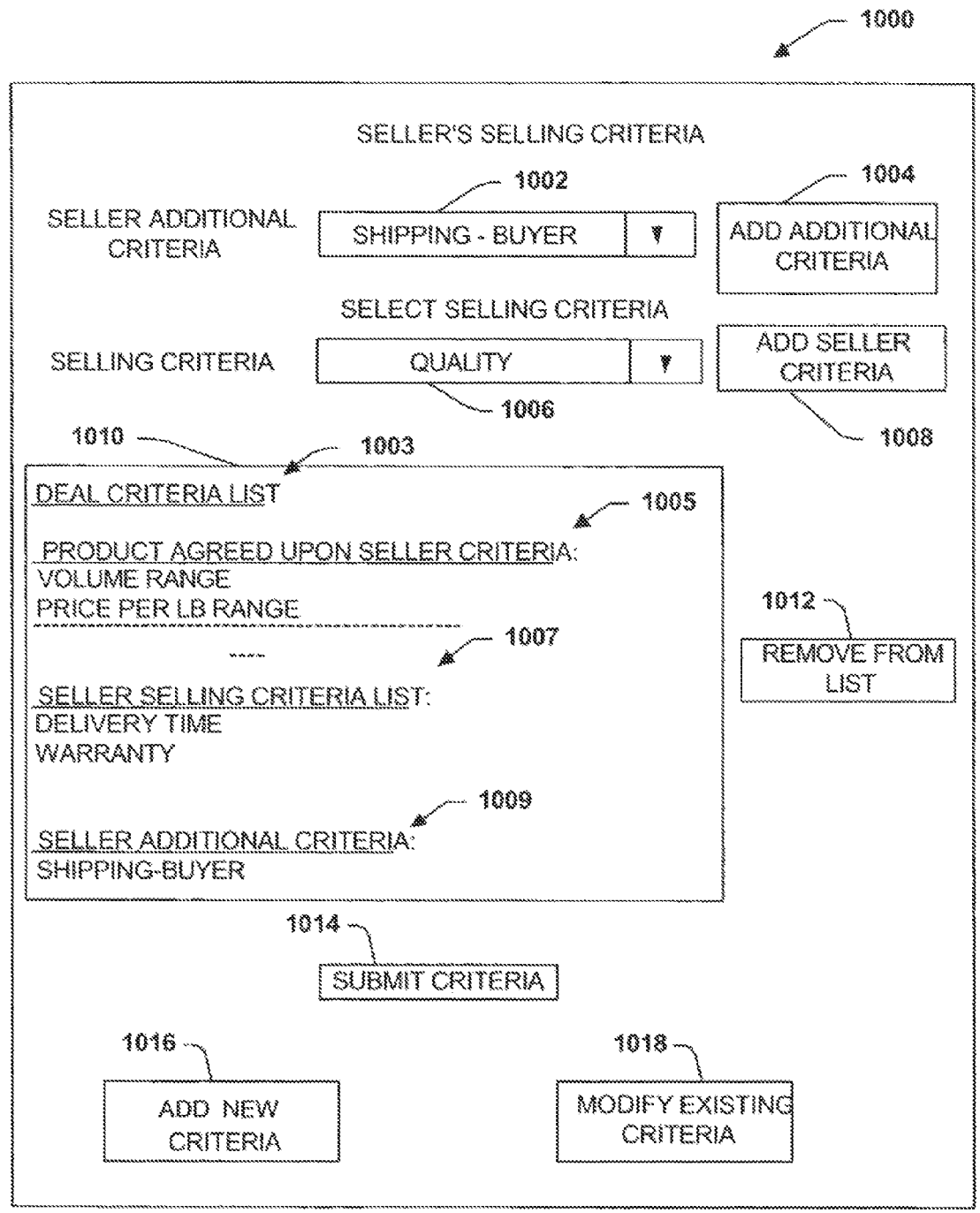
FIG. 14b illustrates a seller's buying and selling criteria input screen in accordance with one aspect of the present invention.

Turning now to FIG. 14a, in accordance with one aspect of the present invention, registered sellers 720 enter into a "Create or Modify Deal" screen 975. The seller 720 can choose a product or service from the product/service scroll down menu 976 and choose to either click on an "Open New Deal" button 978, a "Modify Existing Deal" button 980 or a "Review Buyer Inputted Criteria" button 982. If the buyer selects the "Review Buyer Inputted Criteria" button 982, the seller will be provided with a list of buyer buying criteria that the buyers 715 manually inputted into the window 860 of FIG. 10a. This allows the sellers 720 to review criteria that are important to their buyers, which the seller was not aware. If a seller 720 chooses to click on the "Open New Deal" button 978, the seller 720 will enter into a "Seller's Product Selling Criteria" input screen 1000, as illustrated in FIG. 14b. If the seller 720 chooses to click on the "Modify Existing Deal" button 980, the seller 720 will enter into a "Seller's Product Offering Criteria" input screen 1030, as illustrated in FIG. 14c with the seller being prompted to enter a deal number, which causes the ordering criteria of the chosen deal number to be editable in the input screen.

Referring to FIG. 14b illustrating the "Seller's Selling Criteria" input screen 1000, the seller 720 can begin building a new deal by first selecting a number of seller additional criteria, and seller criteria from a list in a scroll down menu 1002 and a list in scroll down menu 1006, respectively. The seller can click on the "Add Seller Additional Criteria" button 1004 for adding seller additional criteria from the scroll down menu 1002 into a window 1010 containing a deal criteria list 1003. The deal criteria list 1003 includes a first portion listing the "Product Agreed upon Seller Criteria" 1005, decided by the group of sellers for a particular product/service and/or the system administrator, a second portion which is the seller criteria list 1007 and a third portion which is the seller additional criteria list 1009. It should be noted that the criteria in the seller additional criteria list is not a mandatory criteria for the buyer when the buyer is inputting the buyer's buying criteria in step 945 of FIG. 11, but is listed in the terms and condition step 965 after a deal is chosen by the buyer. The seller can add seller criteria by selecting the criteria from the scroll down bar 1006 and clicking on the "Add Seller Criteria" button 1008. The seller can remove any of the criteria from the overall criteria list, except for the "Product Agreed upon Seller Criteria", by highlighting the selection with the computer mouse and clicking on a "Remove from List" button 1012. The seller 720 can add new selling criteria by clicking on a hyperlink 1016 labeled "Add New Criteria" sending the seller 720 to an "Adding and Modifying Deal Criteria" screen 1060, illustrated in FIG. 14d. The seller can modify current criteria by highlighting the criteria in window 1010 and clicking on a hyperlink 1018 labeled "Modify Existing Criteria" sending the seller to the "Adding and Modifying Deal Criteria" screen 1060 with the criteria information defaulting to the highlighted criteria for modification therefrom.

Figure 14C:
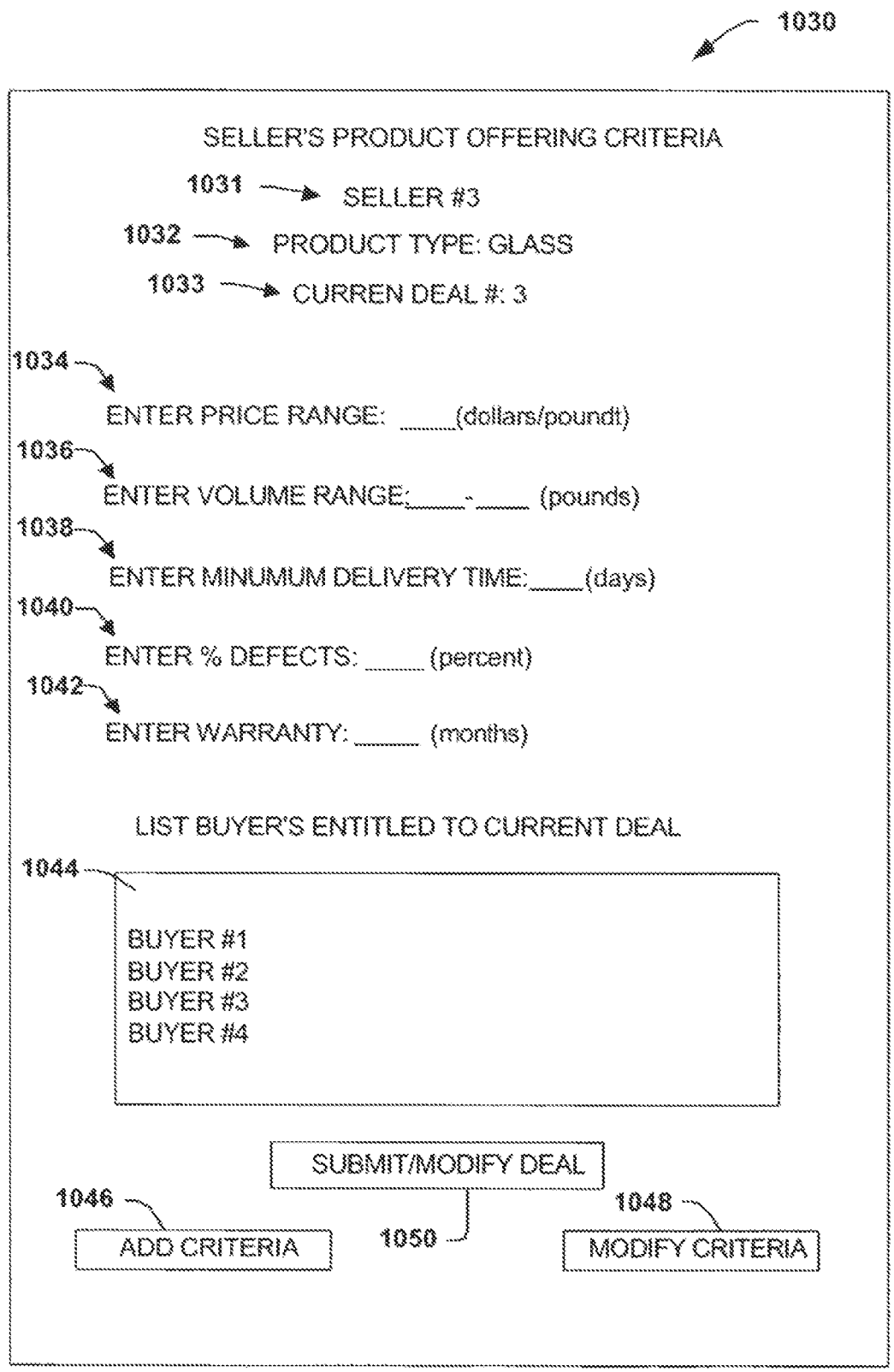
FIG. 14c illustrates a seller's product ordering criteria input screen in accordance with one aspect of the present invention.

Referring now to FIG. 14*c*, once the criteria are selected and submitted, the system generates the "Seller's Product Offering Criteria" input screen 1030. A seller number 1031, a product type 1032 and a current deal number 1033 are automatically generated at the top of input screen 1030. The seller 720 can enter offering limits relating to the selling criteria of the seller's product for a particular deal. The seller's offering criteria of this example includes: price 866 in dollars per pound; volume range 868 in the number of pounds; delivery time 870 in days; the % of defects 872 in percent; and the warranty 874 in months. The seller 720 can then list the names of the buyers 715 in a window 1044 that the deal is being offered or type in the term "All" if the offer is open to any buyer. Once the seller offering criteria is entered, the seller 720 can submit the deal by clicking on a "Submit/Modify Deal" button 1050 on the computer screen by using the computer's mouse. The present invention then creates a record of the deal in a database of deals offered by various sellers 720 of the product, so that deals which seller's offering criteria match the buyer's ordering criteria can be outputted to the buyer 715 in a list of deals on the "Deals Matching Ordering Criteria" output page 880, as shown in FIG. 10*c*.

Referring now to FIG. 14*d*, the "Adding Deal Criteria" input screen 1060 will be described. The seller number 1031, the product type 1032 and the current deal number 1033 are automatically generated at the top of input screen 1060. The seller 720 can enter a criteria name in the "Enter Criteria Name" box 1062. The seller can then choose whether the criteria are a seller type or a seller additional criteria type from a first scroll down menu 1064. The seller 720 can choose a criteria type from a second scroll down menu 1066 and the criteria units in a third scroll down menu 1068. The seller can submit these new criteria for the current deal by clicking on the "Submit New Criteria for Current Deal" button 1070 or add the new criteria for all the product deals by clicking on the "Submit New Criteria for All Product Deals" button 1072. The seller 720 may at any time review the buyer inputted criteria submitted by the buyer 715 that is not in any of the seller's deals by clicking on the "Review Buyer Inputted Criteria" button 1076. The seller 720 can review this list to determine whether or not the seller 720 would like to add these criteria to the present deal or all deals to ensure that they are in accord with buyer needs. The seller 720 may also review the criteria that are offered by other sellers, but not the current seller, by clicking on a "Review Other Seller Criteria" button 1078. This will help the seller keep current on what the other seller's selling criteria are being utilized for matching to the buyer's buying criteria to satisfy the current market demands.

If the seller would like to return to the "Create or Modify Deal" screen 975 the seller 720 can click on the "Cancel" button at any time. Furthermore, if the seller 720 simply desires to re-perform the search, the seller 720 at any time is able to return back to a previous screen selecting the "back" function available using an Internet browser such as, for example, Microsoft Internet Explorer, Netscape, etc. Additionally, a hyperlink to various screens, such as the search screen, preferably is provided on each web page.

Figure 15:
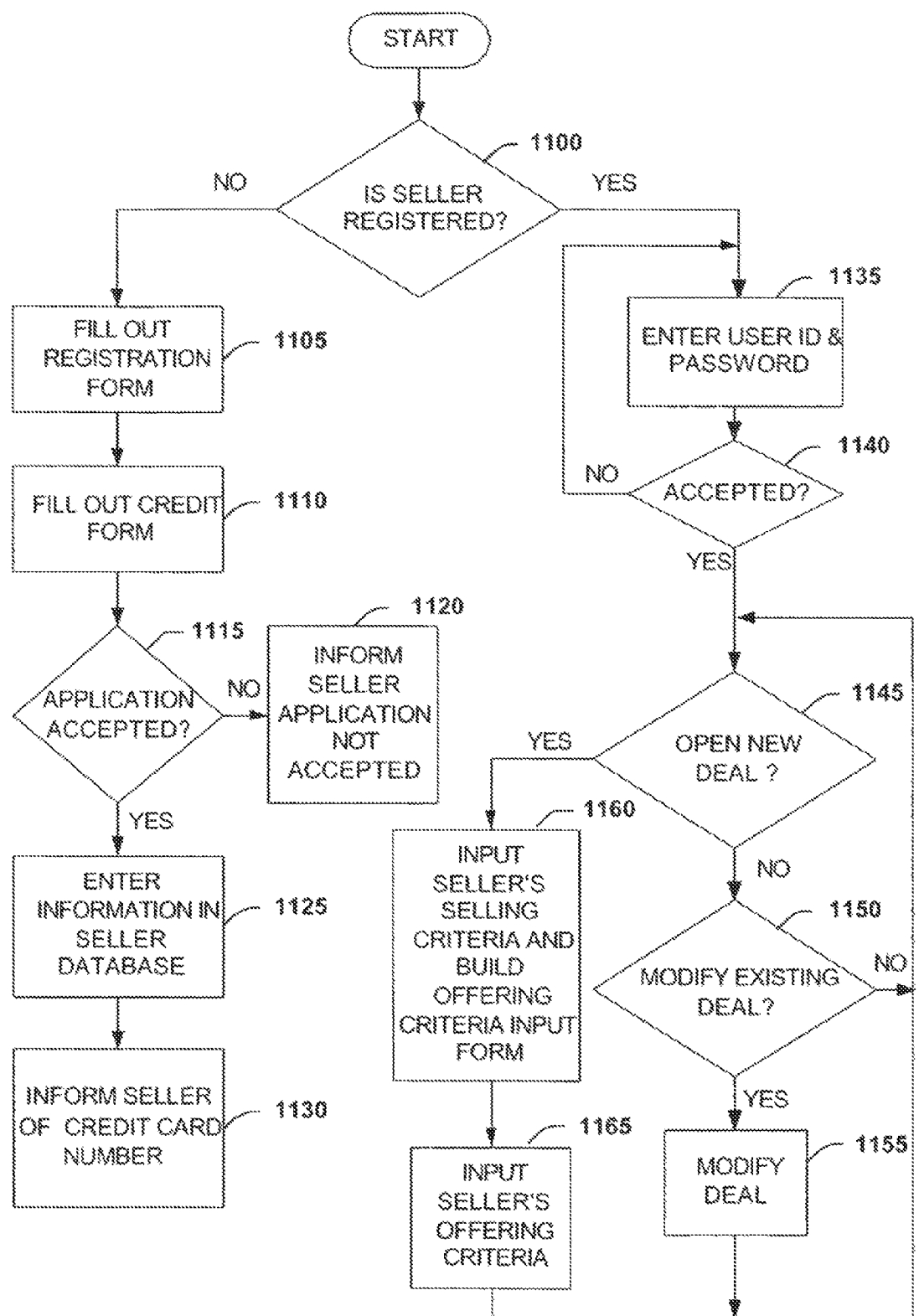
FIG. 15 illustrates a flow chart for a seller desiring to conduct business electronically in accordance with one aspect of the present invention.
Figure 18:
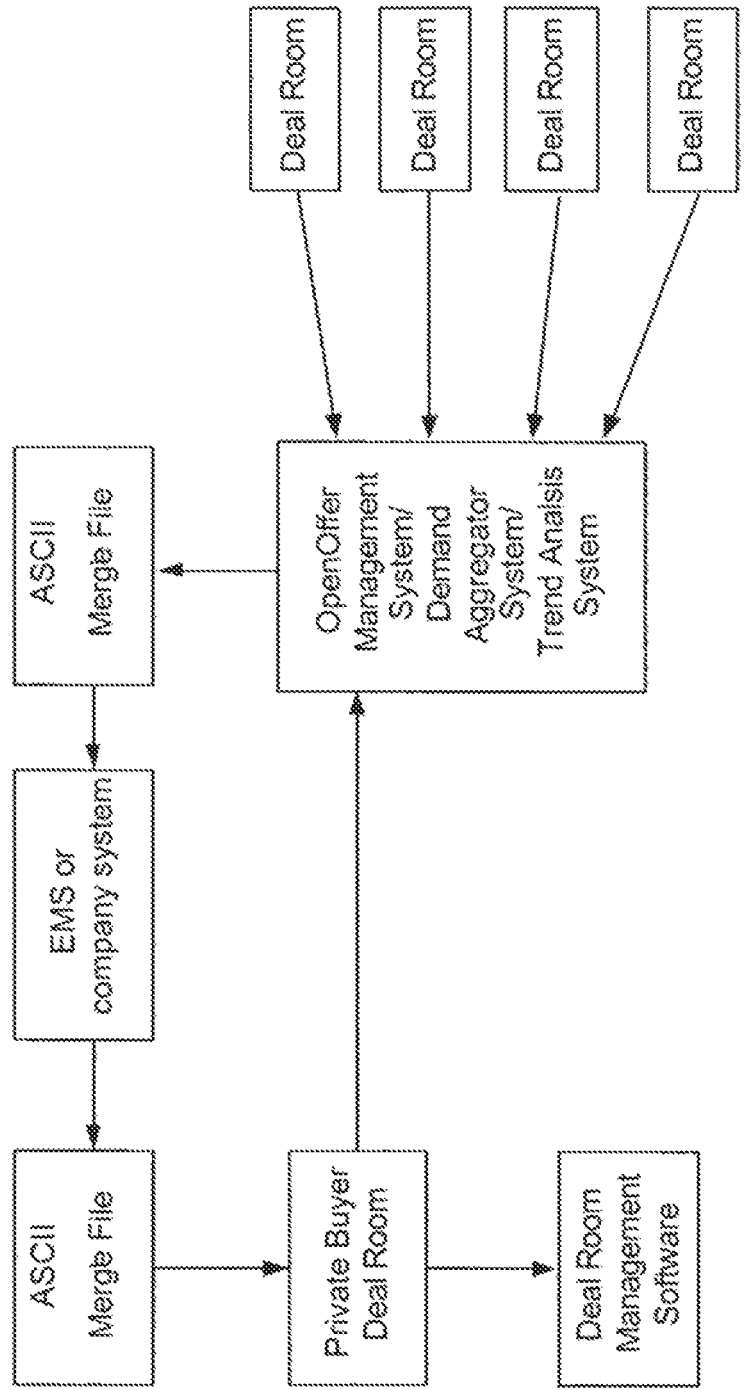
FIG. 18 is a schematic illustration of an ordering process in connection with the above-identified invention.
Figure 19:
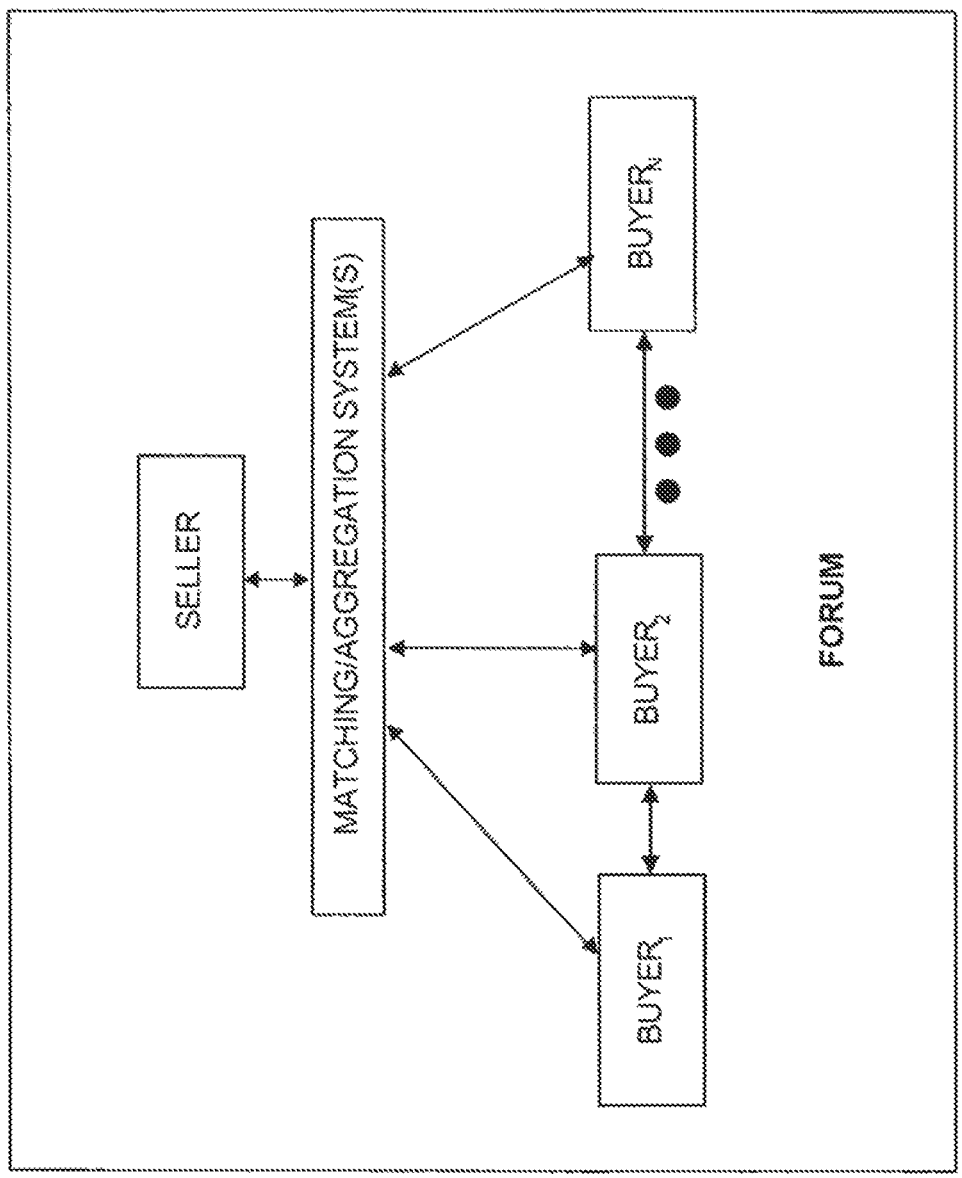
FIG. 19 is a schematic illustration of an electronic forum for conducting a seller sponsored business transaction.

Proceeding now to FIG. 15, the operations of the processor 800 of the central server 725 in handling sellers 720 is depicted. In particular, the processor 800 in step 1100 initially determines whether a seller 720 is registered or not based on which hyperlink 830, 840 (FIG. 9) the seller 720 selects. If the seller 720 selects hyperlink 840 indicating the seller is not registered, the processor 800 proceeds to step 1105. In step 1105, the processor 800 provides the seller 720 with a seller's registration form 1108 (FIG. 16) to fill out. The registration form 1108 is similar to the registration form 908 for the buyer 720 and allows the seller 720 to select a preferred user ID and password. Once completed, the processor 800 proceeds to step 1110 where the seller 720 is requested to submit a credit card application so that all costs and fees associated with conducting business may be directly billed to the seller's credit card. As discussed above, the credit card approval process may occur by a third party vendor accessible via a hyperlink.

Once the credit card application is submitted by the seller 720, the processor 800 proceeds to step 1115 where the processor 800 determines if the credit card application has been approved. If the credit card application has not been approved, the processor 800 proceeds to step 1120 where the seller 720 is informed that their credit card application has not been approved and the seller 720 is provided with a customer service telephone number so that the seller 720 may optionally set up the account in a different fashion. If, however, in step 1115 the credit card application is accepted, the processor 800 proceeds to step 1125 where the seller information is stored in a seller database 1127 (FIG. 17). Finally, in step 1130, the processor 800 is configured to provide the seller 720 with the newly issued credit card number so that the seller 720 is able to open deals. Further, the processor 800 is configured to provide a report to a system administrator who then mails a confirmation copy of the seller's information stored in the seller's database to the seller 720. This completes the seller's registration process.

Continuing to refer to FIG. 15, if in step 1100 a seller has already registered, the seller 720 may login as a registered user by selecting the registered user hyperlink 830 (FIG. 9). Once selected, the processor 800, in step 1135 prompts the seller 720 to enter their user ID and password. Upon input of the user ID and password, the processor 800 proceeds to step 1140 where the processor 800 verifies a valid user ID and password have been entered by comparison with the information stored in the seller database 1127 (FIG. 17). If the user ID and password entered by the seller 720 does not match any entry in the seller database 1127, the processor 800 in step 1140 returns to step 1135 for re-entry of such information. If, however, in step 1140, a valid user ID and password are entered, the processor 800 proceeds to step 1145.

Upon successful entry of a user ID and password, the seller 720 is provided with a seller option screen 975 as shown in FIG. 14*a*. For example, the seller 720 may decide to open a new deal 882 or the seller 720 may decide to view a current deal 882 for one of a number of goods or services offered by the seller 720 or review a list of buyer inputted criteria. Accordingly, if in step 1145, the processor 800 determines that the seller 720 desires to open new deal 882 for a selected product, the processor 800 proceeds to step 1160.

In step 1160, the processor 800 requests that the seller 720 enter the seller's selling criteria, so that the system can build a seller's product offering criteria input screen, in step 1165. For example, in the present aspect the product agreed upon seller criteria is the volume range of the order and the price per pound of the order, the seller's selling criteria includes the delivery time and warranty with quality to be added next, and the seller additional criteria is that the buyer pay the cost of shipping the goods. As discussed above, the processor 800 utilizes the information input from the seller 720 to display a seller's product ordering input form 1030.

In step 1165, the processor 800 request that the seller enter the limits associated with the seller's selling criteria chosen in step 1160, and the list of buyer's entitled to be offered the present deal. The information is entered and submitted to form a deal. The processor 800 uses this information to match buying and ordering criteria of the buyer with selling and offering criteria of the seller, so that deals can be completed in an expedited manner.

Continuing to refer to FIG. 15, if in step 1145, the seller 720 has not selected to open a new deal, the processor 800 determines in step 1150 whether the seller 720 has decided to modify an existing deal 882. In the present aspect of the invention, the seller 720 is limited to modify those deals which they have opened. Accordingly, if the processor 800 determines that the seller does desire to modify a deal 882, the processor 800 provides the seller 720 with a list of deals 880 which the seller has opened. Upon selection of one of the deals 882, the processor 800 proceeds to step 1155 where the deal 882 is displayed to the seller 720. If a deal 882 is not entered in step 1150, or following steps 1155 and 1160, the processor 800 returns to step 1145.

The present invention may be implemented via object oriented programming techniques. In this case each component of the system, could be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

The present invention can employ abstract classes, which are designs of sets of objects that collaborate to carry out a set of responsibilities. Frameworks are essentially groups of interconnected objects and classes that provide a prefabricated structure for a working application. It should also be appreciated that the PCM and the shared memory components could be implemented utilizing hardware and/or software, and all such variations are intended to fall within the appended claims included herein.

According to an exemplary aspect of the present invention, Java and CORBA (Common Object Request Broker Architecture) are employed to carry out the present invention. Java is an object-oriented, distributed, secure, architecture neutral language. Java provides for object-oriented design which facilitates the clean definition of interfaces and makes it possible to provide reusable "software ICs." Java has an extensive library of routines for copying easily with TCP/IP protocols like HTTP and FTP. Java applications can open and access objects across a network via URLs with the same ease to which programmers are accustomed to accessing a local file system.

Furthermore, Java utilizes "references" in place of a pointer model and so eliminates the possibility of overwriting memory and corrupting data. Instead of pointer arithmetic that is employed in many conventional systems, the Java "virtual machine" mediates access to Java objects (attributes and methods) in a type-safe way. In addition, it is not possible to turn an arbitrary integer into a reference by casting (as would be the case in C and C++ programs). In so doing, Java enables the construction of virus-free, tamper-free systems. The changes to the semantics of references make it virtually impossible for applications to forge access to data structures or to access private data in objects that they do not have access to. As a result, most activities of viruses are precluded from corrupting a Java system.

Java affords for the support of applications on networks. Networks are composed of a variety of systems with a variety of CPU and operating system architectures. To enable a Java application to execute anywhere on the network, a compiler generates an architecture neutral object file format—the compiled code is executable on many processors, given the presence of the Java runtime system. Thus, Java is useful not only for networks but also for single system software distribution. In the present personal computer market, application writers have to produce versions of their applications that are compatible with the IBM PC and with the Apple Macintosh.

However, with Java, the same version of the application runs on all platforms. The Java compiler accomplishes this by generating byte code instructions which have nothing to do with a particular computer architecture. Rather, they are designed to be both easy to interpret on any machine and easily translated into native machine code on the fly.

Being architecture neutral, the "implementation dependent" aspects of the system are reduced or eliminated. The Java virtual machine (VM) can execute Java byte codes directly on any machine to which the VM has been ported. Since linking is a more incremental and lightweight process, the development process can be much more rapid and exploratory. As part of the byte code stream, more compile-time information is carried over and available at runtime.

Thus, the use of Java in the present invention provides a server to send programs over the network as easily as traditional servers send data. These programs can display and manipulate data on a client computer. The present invention through the use of Java supports execution on multiple platforms. That is the same programs can be run on substantially all computers—the same Java program can work on a Macintosh, a Windows 95 machine, a Sun workstation, etc. To affect such multi-platform support, a network interface 805 and a network browser (not shown) such as Netscape Navigator or Microsoft Internet Explorer may be used in at least one aspect of the present invention. It should be appreciated, however, that a Java stand-alone application may be constructed to achieve a substantially equivalent result. Although the present invention is described with respect to employing Java, it will be appreciated that any suitable programming language may be employed to carry out the present invention.

An Internet explorer (e.g., Netscape, Microsoft Internet Explorer) is held within the memory of the client computer. The Internet Explorer enables a user to explore the Internet and view documents from the Internet. The Internet Explorer may include client programs for protocol handlers for different Internet protocols (e.g., HTTP, FTP and Gopher) to facilitate browsing using different protocols.

It is to be appreciated that any programming methodology and/or computer architecture suitable for carrying out the present invention may be employed and are intended to fall within the scope of the hereto appended claims.

The following discussion concerns alternative aspects of the present invention. This discussion is provided to highlight alterative systems and methods, but in is not to be construed as limiting the invention to the particular aspects disclosed.

Buyer Sponsored Deal Room

Figure 20:
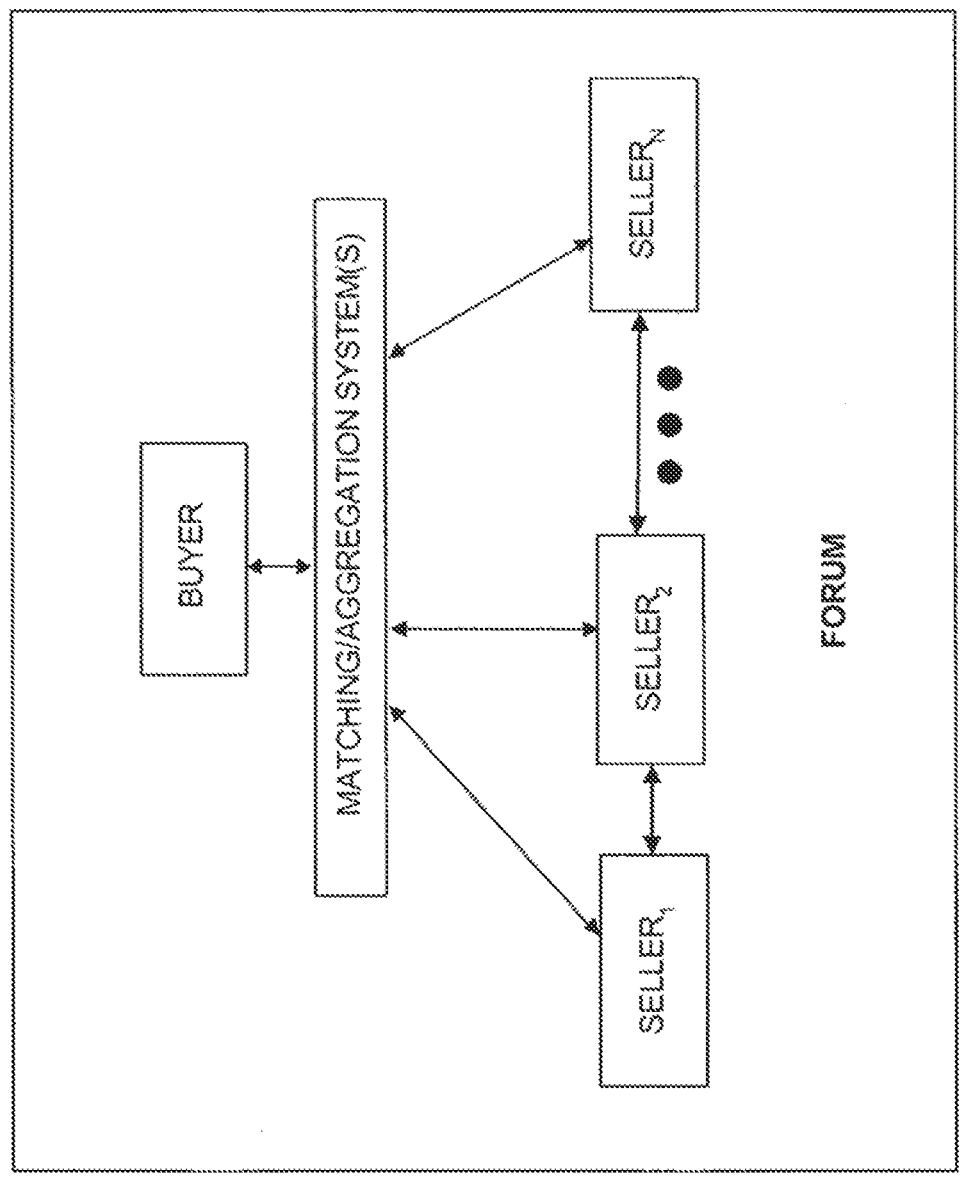
FIG. 20 is a schematic illustration of an electronic forum for conducting a buyer sponsored business transaction.

Regarding FIG. 20, although the present invention has been largely described within the context of a seller sponsored deal room, it is to be appreciated that a buyer or buyers may sponsor a deal room to aggregate purchasing goods/services from a plurality of sellers. For example, a large corporate buyer may employ the present invention to create a deal room where a plurality of sellers may assemble to aggregate selling of specific goods and/or services that the buyer desires. Such a transaction facilitates the buyer satisfying purchase requirements in one forum and to coordinate deliver of goods/services. Furthermore, such a system facilitates sellers making sales to the buyer, which but for the sellers being able to aggregate the buyer may not have dealt with the individual seller because of insufficient capacity to meet the buyer's needs. The subject specification describes exemplary systems and interfaces for implementing the subject invention, and therefore further discussion thereto is omitted for sake of brevity. However, it is to be appreciated that one skilled in the art based on the above discussion regarding seller sponsored deal rooms/transactions could apply such teachings to implement the aforementioned buyer sponsored deal room/transaction.

Multiple Buyer and Multiple Seller Sponsored Deal Room/Transaction

Figure 21:
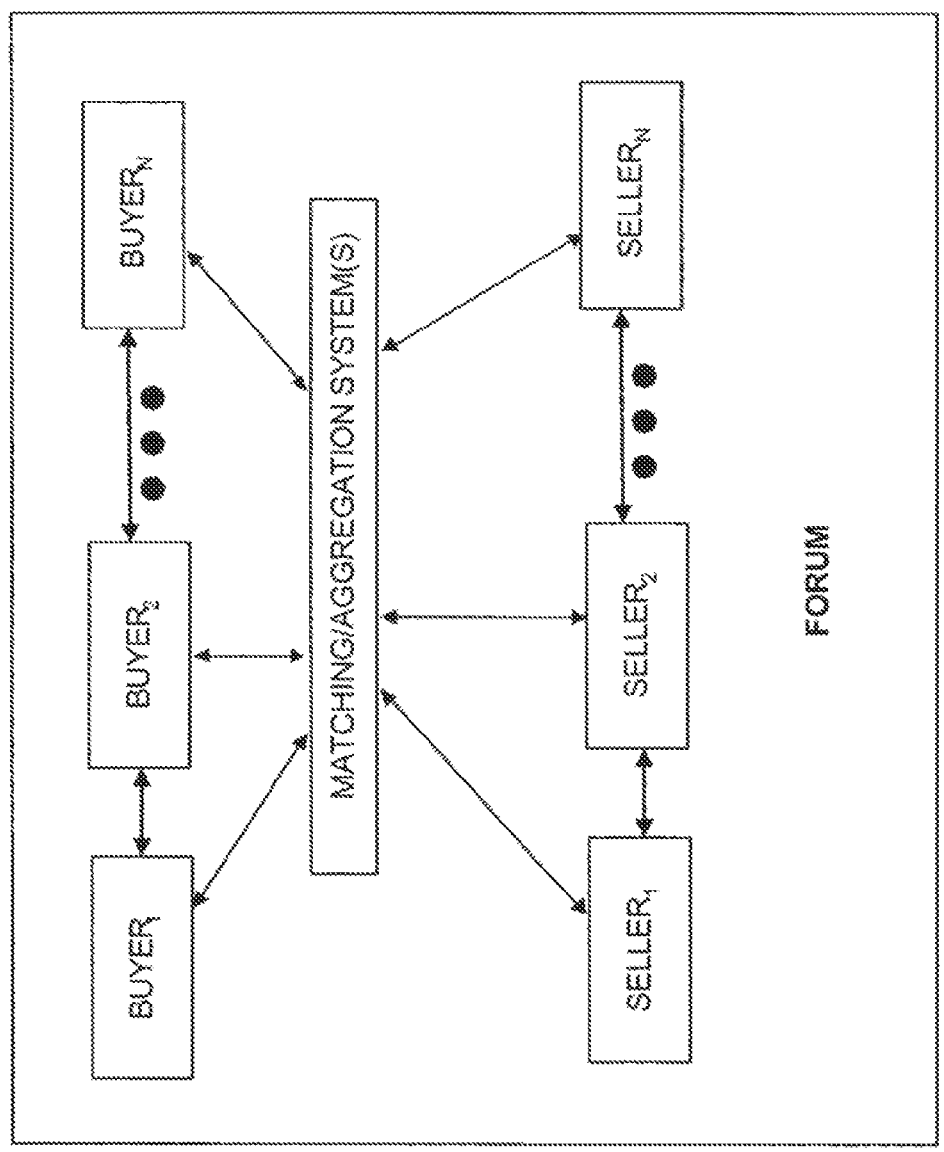
FIG. 21 is a schematic illustration of an electronic forum for conducting a buyer and seller co-sponsored business transaction.

Regarding FIG. 21, although the present invention has been largely described within the context of a seller sponsored deal room/transaction, it is to be appreciated that buyers and sellers may concurrently sponsor a deal room/transaction to aggregate selling of and purchasing of goods/services by a plurality of sellers and buyers respectively. For example, a multiple sellers and buyers may employ the present invention to create a deal room/transaction forum where a plurality of sellers and buyers may assemble to aggregate selling and buying of specific goods and/or services that the sellers which to sell and the buyers desire to purchase. Such a transaction forum creates great efficiencies with respect to purchase price and/or selling quantity of particular goods/services. For example, in such a forum dedicated to the selling and purchasing of a specific product/service, sellers can assemble to compete for the sale of their respective product/service which leads to pricing efficiencies. Buyers can assemble in such a forum to aggregate buying power in order to negotiate good prices and close deals. Sellers on the other hand may also aggregate to meet the needs of a large buying block. The subject specification describes exemplary systems and interfaces for implementing the subject invention, and therefore further discussion thereto is omitted for sake of brevity. However, it is to be appreciated that one skilled in the art based on the above discussion regarding seller sponsored deal rooms/transactions could apply such teachings to implement the aforementioned buyer sponsored deal room/transaction.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile device that electronically facilitates business transactions, comprising:
   a wireless transceiver that receives product data from a communications network as a function of location of the mobile device, wherein the product data relates to a good or service available at one or more discounted prices;
   an input that receives criteria from a user of the mobile device with respect to a delivery time for the good or service, the delivery time expressed in a number of days or nights that the good or service are reserved for use;
   a display that:
      presents a prompt for the user to create an account,
      presents a request for a method of payment for business transactions using the account, and
      presents offers that meet the delivery time criteria of the user of the mobile device;
   memory storing non-transitory computer readable instructions that are executed by a processor to:

sort the offers that meet the delivery time criteria of the user in response to a sorting request generated by the user at the input,
present the sorted offers on the display in accordance with the sorting request,
prompt the user to select at least one offer from the sorted offers, the at least one offer including terms and conditions associated with the at least one offer,
electronically facilitate a business transaction with a remote computing device to purchase the at least one offer using the method of payment associated with the user account upon acceptance of the terms and conditions, and
collect information about user interactions with the mobile device.

2. The mobile device of claim 1, wherein the information about user interactions with the mobile device includes one or more of location of the mobile device, criteria received from the user, and offers presented to the user.

3. The mobile device of claim 1, wherein the sorting request generated by the user is stored and associated with the user account.

4. The mobile device of claim 1, wherein the location is determined based upon global positioning satellite (GPS) data.

5. The mobile device of claim 1, wherein the wireless transceiver may further transmit the product data to another mobile device whereby a user of the another mobile device is prompted to purchase the good or service.

6. The mobile device of claim 1, wherein the product data received by the transceiver from the communications network is also a function of past purchases and location information associated with the past purchases.

7. The mobile device of claim 6, wherein the product data received by the transceiver is a still further function of contact information derived from the created account that includes demographic information and a past good or service shared with at least one other user.

8. The mobile device of claim 1, wherein the product data includes at least one of a product description, a picture, a product price, an advertisement, a reward, or a promotion.

9. The mobile device of claim 1, wherein the sorting request generated by the user includes a particular quality ranking.

10. The mobile device of claim 1, wherein the method of payment is a credit card or debit card.

11. The mobile device of claim 1, wherein the terms and conditions include a grant of permission to an entity collecting information from the use user of the mobile device.

12. The mobile device of claim 11, wherein the grant of permission also includes allowing the entity to sell the collected information to one or more other parties.

13. A method for employing a mobile device to electronically transact business over a communications network, the method comprising:
receiving product data relating to a good or service available at one or more discounted prices, the product data corresponding to a location of the mobile device;
receiving criteria from a user of the mobile device with respect to a delivery time for the good or service, the delivery time expressed in a number of days or nights that the good or service are reserved for use;
presenting a prompt for the user to create an account;
presenting a request for a method of payment for business transactions using the account;
presenting offers that meet the delivery time criteria of the user of the mobile device;
sorting the offers that meet the delivery time criteria of the user in response to a sorting request generated by the user;
presenting the sorted offers on a display of the mobile device in accordance with the sorting request;
prompting the user to select at least one offer from the sorted offers, the at least one offer including terms and conditions associated with the at least one offer;
electronically facilitating a business transaction with a remote computing device to purchase the at least one offer using the method of payment associated with the user account upon acceptance of terms and conditions; and
collecting information about user interactions with the mobile device.

14. The method of claim 13, wherein the number of days or nights is multiple days or nights.

15. The method of claim 13, wherein the number of days or nights is one.

16. The method of claim 13, wherein the number of days or nights is indicated as a beginning day or night and an ending day or night, and wherein the beginning day or night and the ending day or night are not the same day or night.

17. The method of claim 13, wherein the offers that meet the delivery time criteria of the user of the mobile device are packaged with another offer also meeting the delivery time criteria.

18. The method of claim 17, wherein the another offer is discounted.

19. The method of claim 13, further comprising displaying offers that are not available in accordance with the delivery time criteria; and including a message indicating that those offers are not available during the delivery time criteria.

20. The method of claim 13, further comprising displaying a trend associated with the good or service.

21. The method of claim 20, wherein the trend is price.

22. the method of claim 20, wherein the trend is demand.

23. The method of claim 20, wherein the trend is based in part from information collected from third-parties purchasing the good or service.

24. A non-transitory computer readable storage medium having embodied thereon instructions executable by a processor to:
receive product data relating to a good or service available at one or more discounted prices, the product data corresponding to a location of a mobile device;
receive criteria from a user of the mobile device with respect to a delivery time for the good or service, the delivery time expressed in a number of days or nights that the good or service are reserved for use;
present a prompt for the user to create an account;
present a request for a method of payment for business transactions using the account;
present offers that meet the delivery time criteria of the user of the mobile device;
sort the offers that meet the delivery time criteria of the user of the mobile device;
present the sorted offers on a display of the mobile device in accordance with the sorting request;
prompt the user to select at least one offer from the sorted offers, the at least one offer including terms and conditions associated with the at least one offer;
electronically facilitate a business transaction with a remote computing device to purchase the at least one offer using the method of payment associated with the user account upon acceptance of the terms and conditions; and
collect information about user interactions with the mobile device.

* * * * *